(12) United States Patent
Iso et al.

(10) Patent No.: US 10,567,699 B2
(45) Date of Patent: Feb. 18, 2020

(54) INFORMATION PROCESSING APPARATUS TO IMPROVE IMAGE QUALITY BY REMOVING FLICKER COMPONENT FROM CAPTURED IMAGE

(71) Applicant: SONY CORPORATION, Tokyo (JP)

(72) Inventors: Daisuke Iso, Tokyo (JP); Tomoo Mitsunaga, Kanagawa (JP); Kensei Jo, Kumamoto (JP); Makoto Sato, Tokyo (JP); Kentaro Ida, Tokyo (JP); Tomoya Narita, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 64 days.

(21) Appl. No.: 15/521,810

(22) PCT Filed: Aug. 25, 2015

(86) PCT No.: PCT/JP2015/073907
§ 371 (c)(1),
(2) Date: Apr. 25, 2017

(87) PCT Pub. No.: WO2016/072130
PCT Pub. Date: May 12, 2016

(65) Prior Publication Data
US 2017/0251162 A1 Aug. 31, 2017

(30) Foreign Application Priority Data
Nov. 6, 2014 (JP) ................. 2014-226038

(51) Int. Cl.
*H04N 5/72* (2006.01)
*G06T 7/00* (2017.01)
*G11B 27/031* (2006.01)

(52) U.S. Cl.
CPC ............ *H04N 5/72* (2013.01); *G06T 7/00* (2013.01); *G11B 27/031* (2013.01)

(58) Field of Classification Search
CPC .......... H04N 5/72; H04N 5/76; H04N 5/2357; H04B 10/116; G06T 1/0021; G06T 7/00; G11B 27/031
See application file for complete search history.

(56) References Cited

U.S. PATENT DOCUMENTS

| 7,209,571 B2* | 4/2007 | Davis | G06F 21/10 382/100 |
| 7,634,089 B1* | 12/2009 | Burstyn | H04N 5/913 380/200 |
| 9,131,223 B1* | 9/2015 | Rangarajan | G06T 5/50 |

(Continued)

FOREIGN PATENT DOCUMENTS

| JP | 2010-278573 A | 12/2010 |
| JP | 2012-178685 A | 9/2012 |
| JP | 2014-045408 A | 3/2014 |

*Primary Examiner* — Nhan T Tran
(74) *Attorney, Agent, or Firm* — Chip Law Group

(57) ABSTRACT

There is provided an information processing apparatus that includes an image acquisition unit that acquires a captured image, a key information acquisition unit that acquires key information for extracting a light temporal modulation component included in the captured image, and a modulation component extraction unit that extracts the modulation component from the captured image based on the key information.

8 Claims, 21 Drawing Sheets

(56) References Cited

U.S. PATENT DOCUMENTS

| | | | |
|---|---|---|---|
| 2009/0051782 A1* | 2/2009 | Ono | H04N 5/235 348/226.1 |
| 2014/0029809 A1* | 1/2014 | Rhoads | G06K 9/00442 382/112 |
| 2016/0006919 A1* | 1/2016 | Aoyama | H04N 5/2357 348/226.1 |
| 2017/0251171 A1* | 8/2017 | Yamada | H04B 10/116 |

\* cited by examiner

FIG. 1
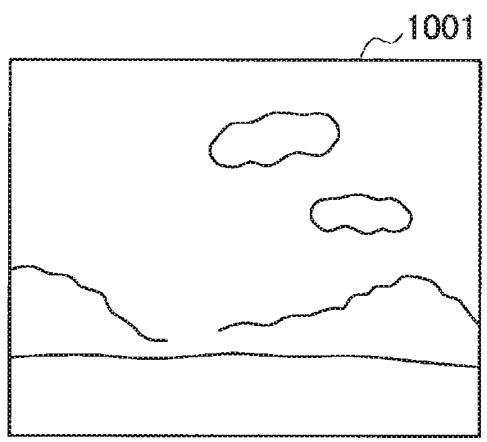
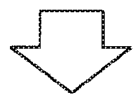
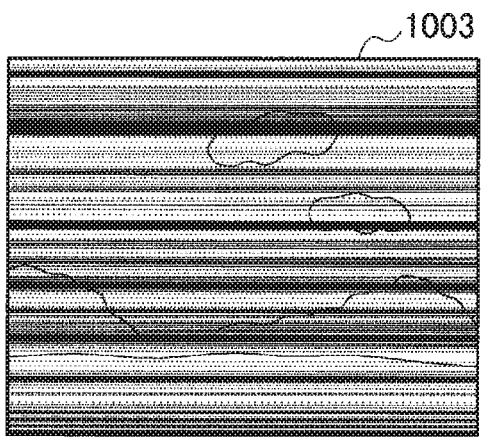

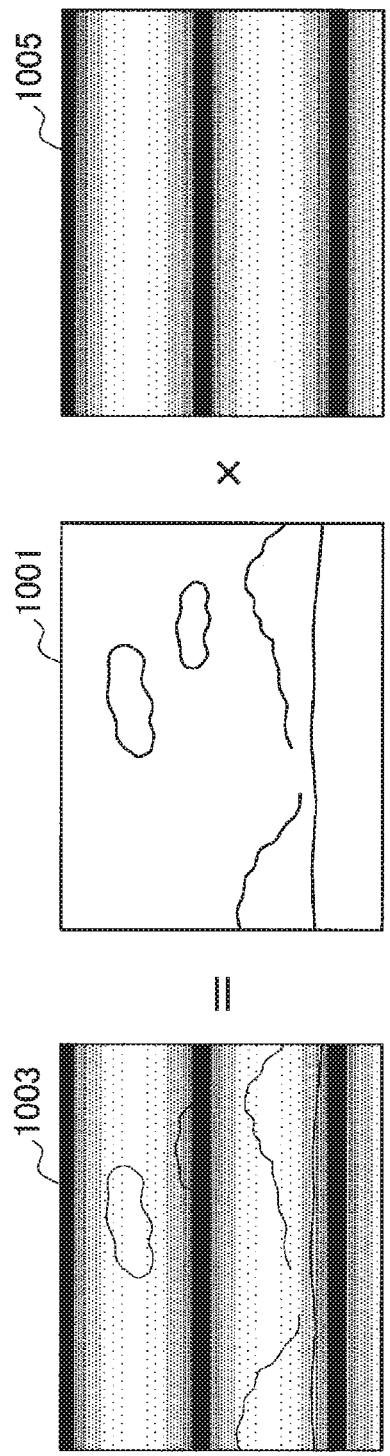

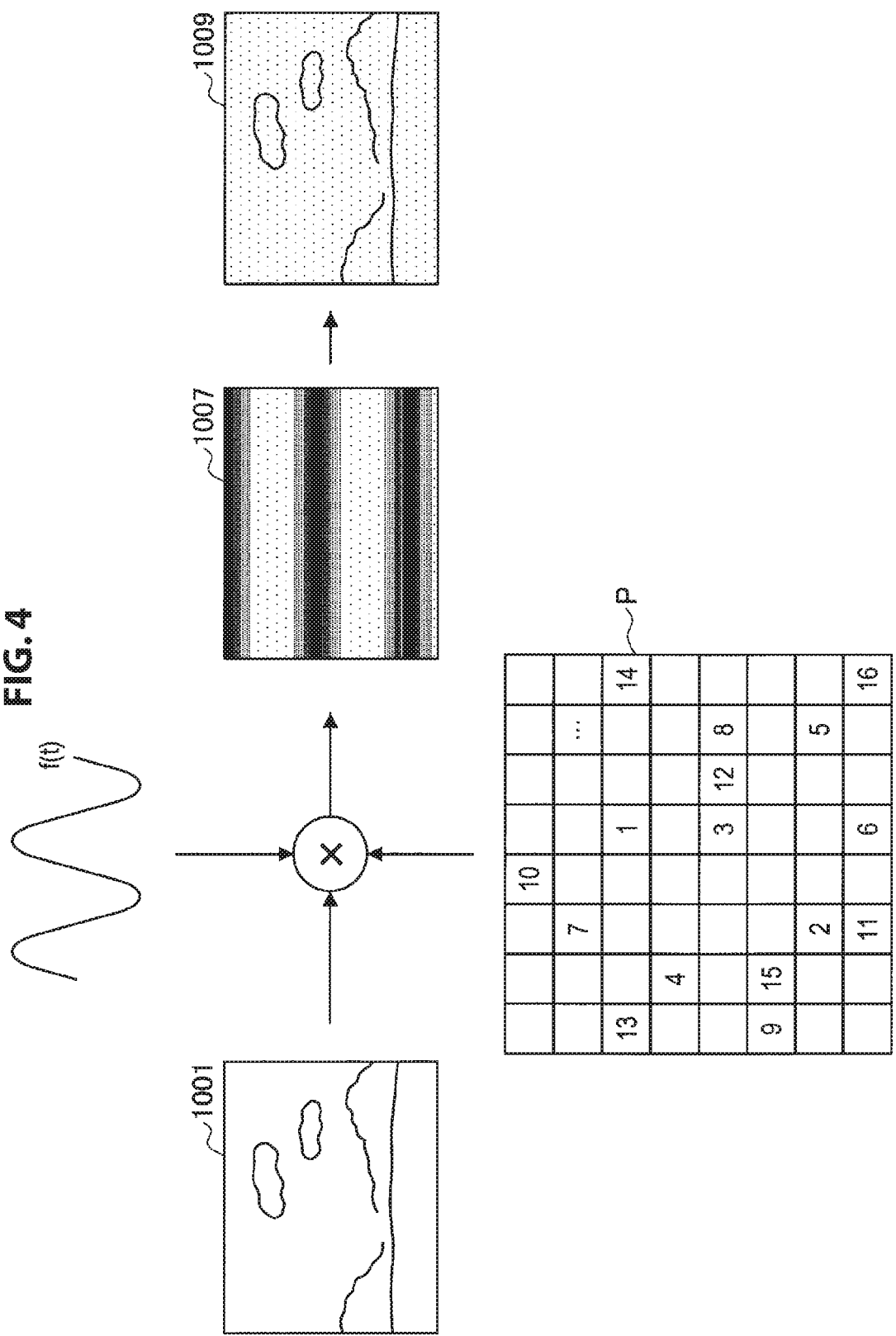

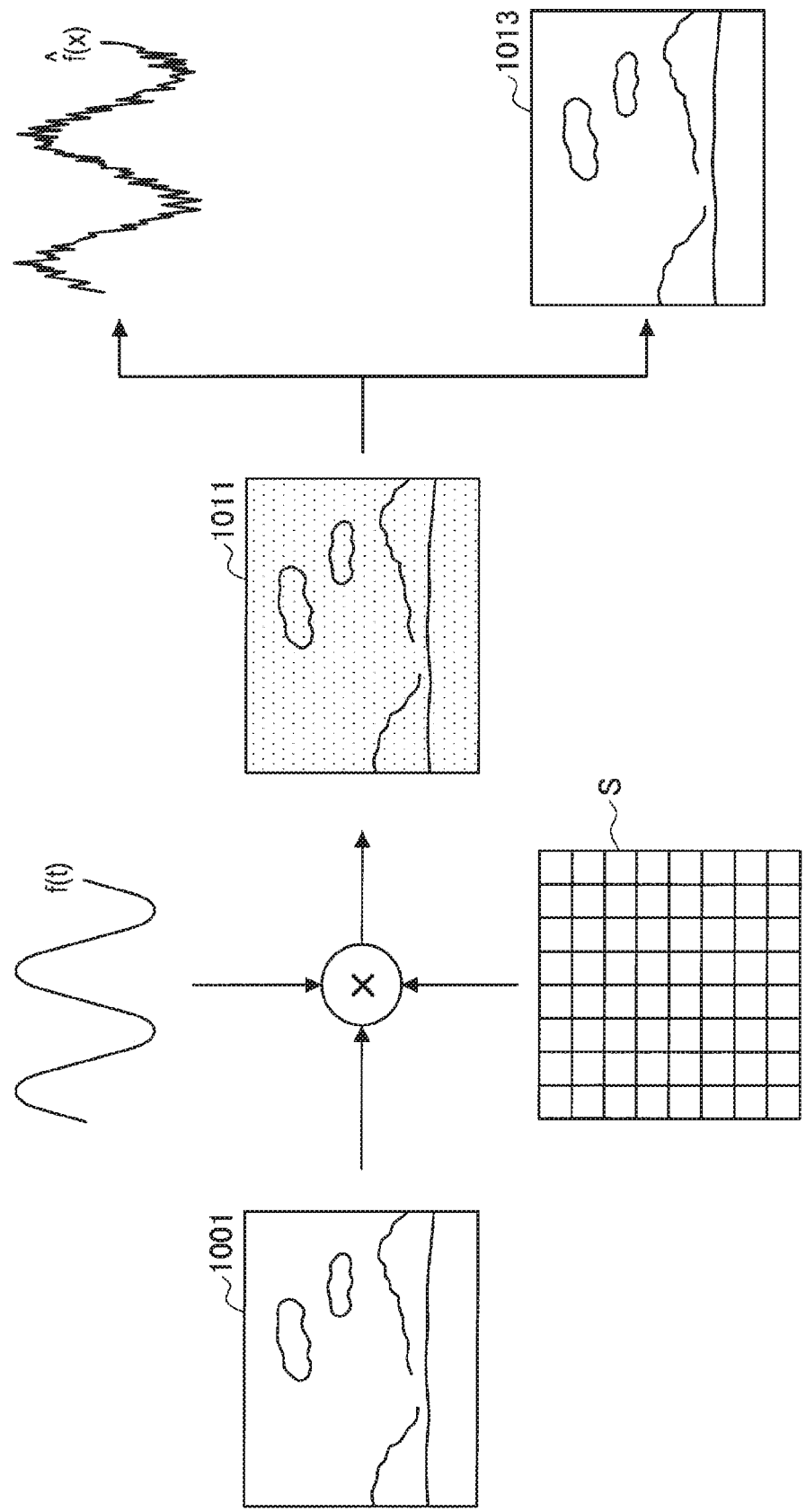

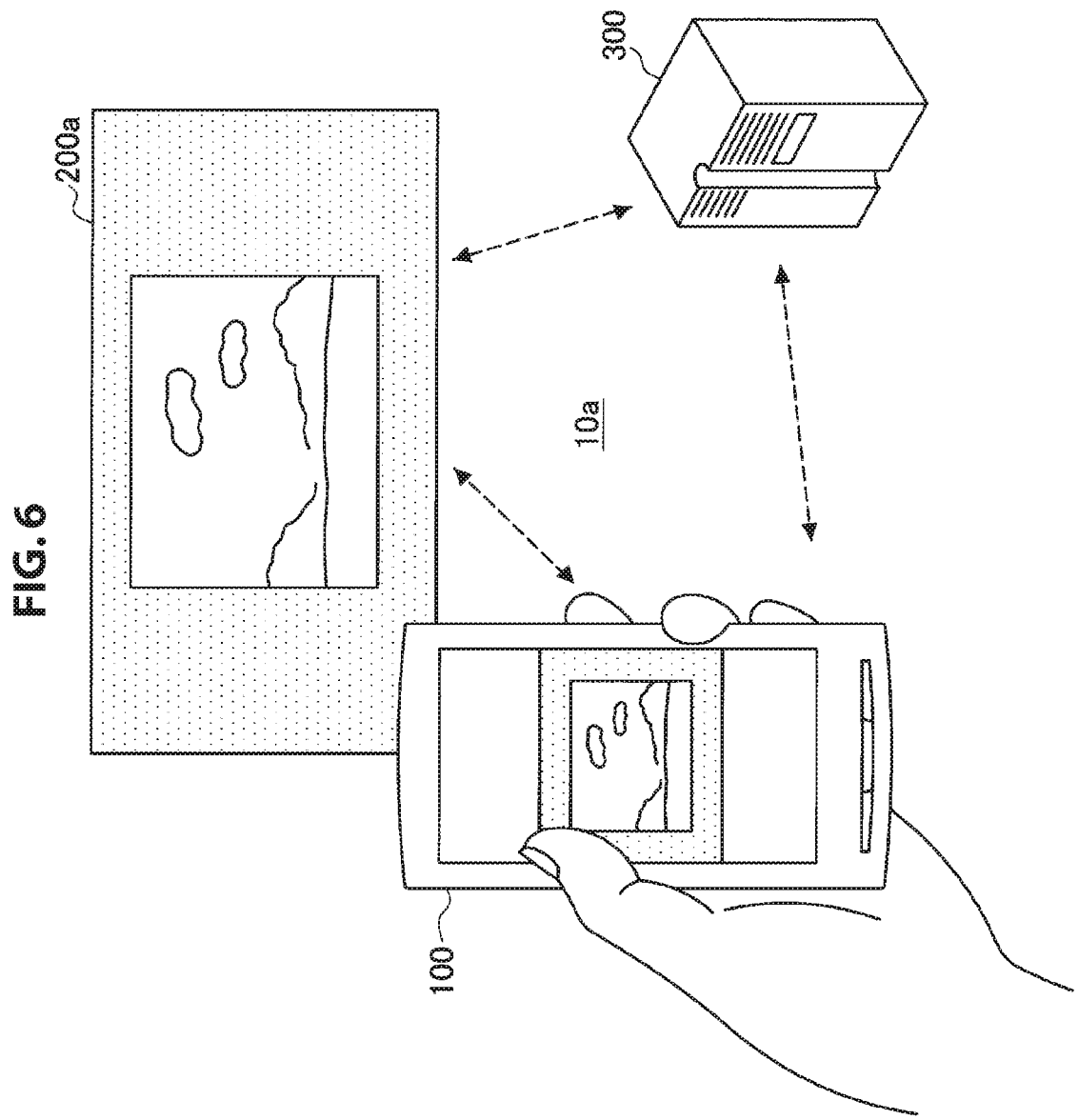

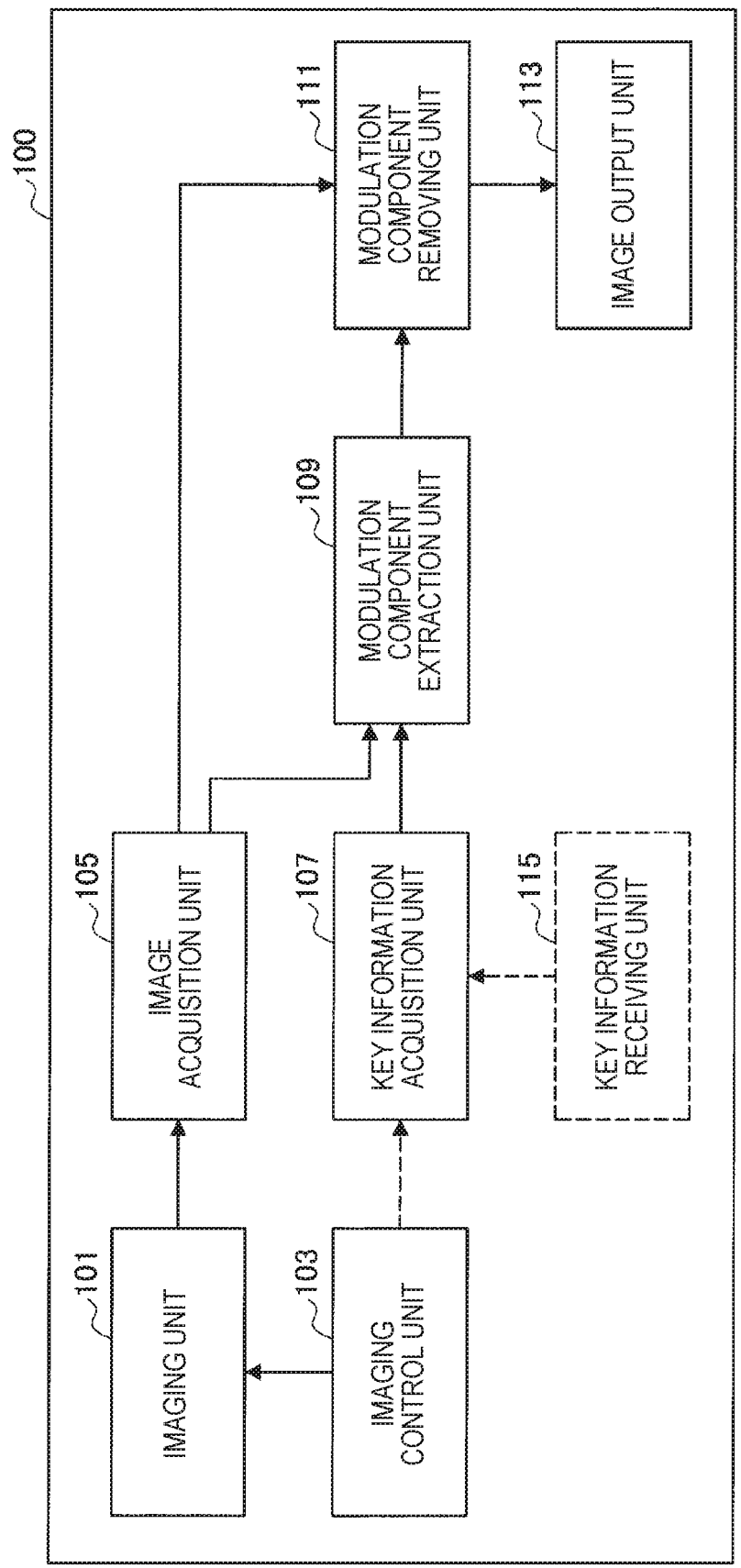

INFORMATION PROCESSING APPARATUS TO IMPROVE IMAGE QUALITY BY REMOVING FLICKER COMPONENT FROM CAPTURED IMAGE

CROSS REFERENCE TO RELATED APPLICATIONS

This application is a U.S. National Phase of International Patent Application No. PCT/JP2015/073907 filed on Aug. 25, 2015, which claims priority benefit of Japanese Patent Application No. JP 2014-226038 filed in the Japan Patent Office on Nov. 6, 2014. Each of the above-referenced applications is hereby incorporated herein by reference in its entirety.

TECHNICAL FIELD

The present disclosure relates to an information processing apparatus.

BACKGROUND ART

It is known that fluctuation of brightness, which is called flicker, is generated in an image that is captured under illumination light, such as a fluorescent lamp, whose brightness cyclically fluctuates, for example. The flicker is generated when a cycle in which an image sensor generates an image differs from a fluctuation cycle of a brightness of an object. For example, when a moving image is captured at a predetermined frame rate, and the frame rate differs from a frequency of illumination light, the brightness of the image can differ between frames. Also, when an image sensor employs a rolling shutter method or the like, and the timing of light exposure differs for each position in a captured image, the brightness of the image cyclically changes in the same frame (thereby, a stripe pattern is generated in the image, for example). The flicker in the captured image is an obstacle in improving the quality of the captured image, and thus various technologies for removing this are proposed. An example of such technologies is described in Patent Literature 1.

CITATION LIST

Patent Literature

Patent Literature 1: JP 2014-45408A

DISCLOSURE OF INVENTION

Technical Problem

On the other hand, a technology that proactively utilizes the flicker is also proposed. When the fluctuation cycle of the brightness that generates the flicker is set shorter than the cycle that eyes of a person can perform recognition, the flicker can be generated in the image that captures the object, without causing the user that directly views the object to feel the flicker. By utilizing this, it is conceived to radiate a light whose brightness changes at a short fluctuation cycle from a screen of a movie theater in order to generate flicker in an image of a movie that is captured illegally, without giving influence in viewing of an audience, for example. However, for example, image capturing is to be authorized to a user that has obtained authorization, for example, by paying a rightful price. Also, it is conceived that some sort of information is expressed by the flicker, as an example that further proactively utilizes the flicker.

Thus, the present disclosure proposes a new and improved information processing apparatus that enables more advanced utilization of a captured image, by utilizing a flicker component that is generated in the captured image.

Solution to Problem

According to the present disclosure, there is provided an information processing apparatus including: an image acquisition unit that acquires a captured image; a key information acquisition unit that acquires key information for extracting a light temporal modulation component included in the captured image; and a modulation component extraction unit that extracts the modulation component from the captured image on the basis of the key information.

Advantageous Effects of Invention

As described above, according to the present disclosure, more advanced utilization of the captured image can be enabled by utilizing the flicker component that is generated in the captured image.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 1 is a diagram for describing a flicker component that is superimposed on an image.

FIG. 2 is a diagram for describing extraction of a flicker component from a captured image.

FIG. 4 is a diagram for describing a specific method for extracting a flicker component from a captured image.

FIG. 5 is a diagram for describing a specific method for extracting a flicker component from a captured image.

FIG. 6 is a diagram illustrating an exemplary configuration of a system according to a first embodiment of the present disclosure.

FIG. 7 is a block diagram illustrating an exemplary functional configuration of an imaging apparatus according to the first embodiment of the present disclosure.

MODE(S) FOR CARRYING OUT THE INVENTION

Figure 3A:
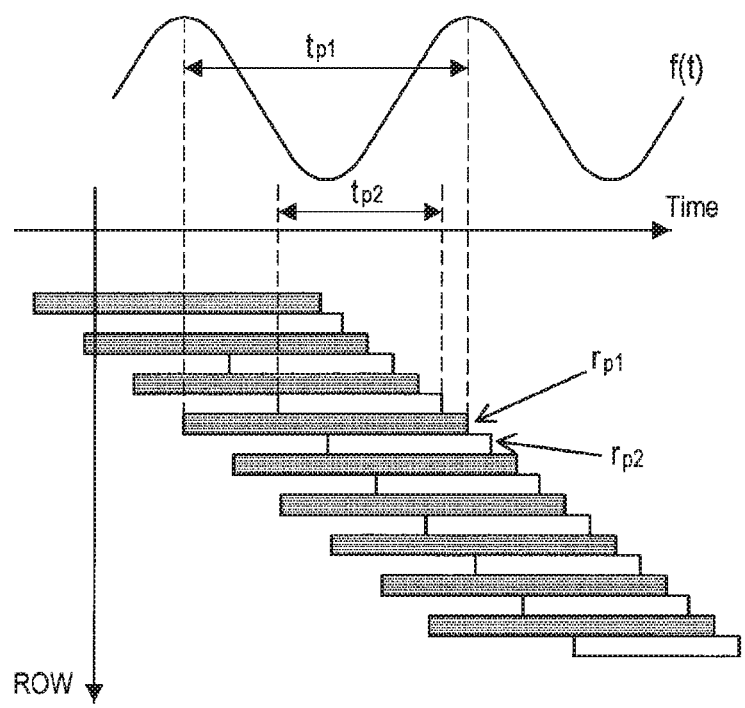
FIG. 3A is a diagram for describing a specific method for extracting a flicker component from a captured image.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be made in the following order.
1. Technology That Can be Utilized in Embodiment
2. Specific Embodiment
2-1. First Embodiment
2-2. Second Embodiment
2-3. Example in Which Server is Included
2-4. Example That Demodulates Flicker Component
2-5. Example That Demodulates and Removes Flicker Component
2-6. Third Embodiment
3. Hardware Configuration
4. Supplement 1. Technology that can be Utilized in Embodiment First, a technology that can be utilized in an embodiment of the present disclosure will be described, with reference to FIGS. 1 to 5. In the embodiment of the present disclosure, a light temporal modulation component that is included in a captured image is utilized. In the below description, this modulation component is also referred to as a flicker component.

FIG. 1 is a diagram for describing a flicker component that is superimposed on an image. As described already, fluctuation of brightness, which is called flicker, is generated in an image that is captured under illumination light whose brightness fluctuates cyclically. In the same principle, the flicker can also be generated in an image that captures an image displayed on a display device such as a liquid crystal display (LCD). FIG. 1 illustrates an image 1001 in which flicker is not generated and an image 1003 in which flicker is generated. For example, when the display device that displays the image 1001 generates temporal fluctuation (flicker component) of the brightness at a cycle that is shorter than the cycle that eyes of a person can perform recognition, the flicker component is temporally integrated in the visual perception of the user that directly views the image 1001, and thus the same image as the image 1001 is observed. On the other hand, the flicker component is observed as brightness change, in the image 1003 that captures the image 1001. The image 1003 of the illustrated example is captured by a rolling shutter method, and thus the stripe pattern of the brightness is generated in the image 1003. For example, when the amplitude of the time fluctuation of the brightness that is added as the flicker component is increased, and further the cycle of the fluctuation is changed in a complicated manner, the image 1003 that is included in the captured image is unable to be viewed.

FIG. 2 is a diagram for describing extraction of the flicker component from the captured image. As described with reference to FIG. 1, in the image 1003 (only the image part is illustrated for the purpose of explanation. ditto for below drawings) that captures the image 1001 displayed on the display device for example, a brightness fluctuation component of a flicker component 1005 that is added by the display device (which is a temporal fluctuation component, but is expressed as a stripe pattern because the image 1003 is captured by the rolling shutter method as described above) is superimposed on the brightness component of the original image 1001. Thus, for example, if the brightness component of the original image 1001 is known, the flicker component 1005 can be extracted. The extracted flicker component 1005 may be handled as spatial brightness fluctuation as it is, for example, and may be converted to temporal brightness fluctuation on the basis of a speed at which light exposure progresses for each position in the image sensor (for each row in the illustrated example). In either case, the brightness fluctuation of the flicker component 1005 is considered as the modulation component of the cycle (frequency) and the amplitude, and information can be taken out by demodulating this.

Figure 3B:
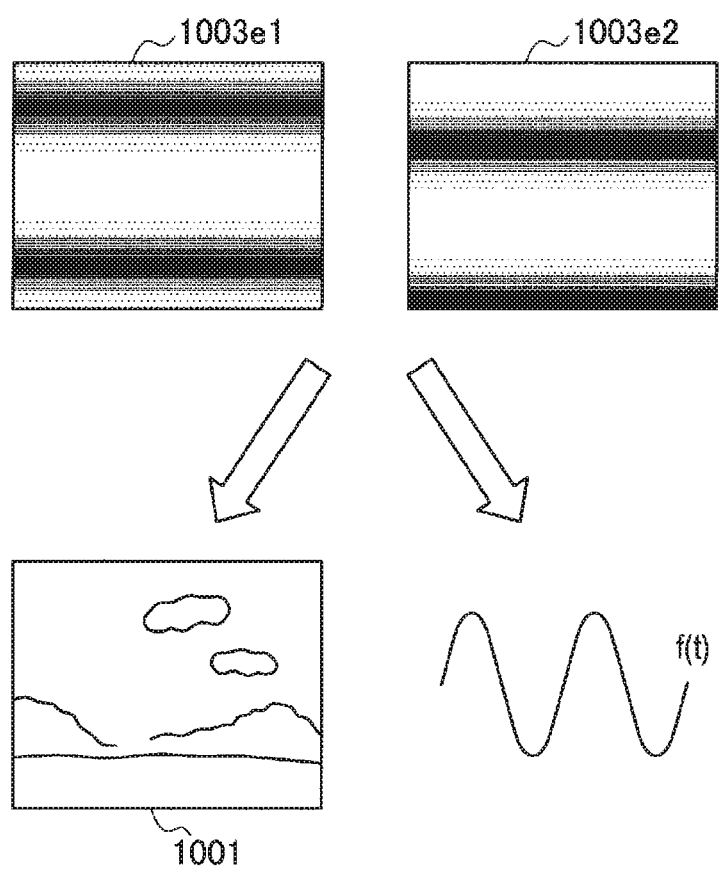
FIG. 3B is a diagram for describing a specific method for extracting a flicker component from a captured image.

FIGS. 3A and 3B are diagrams for describing a specific method for extracting the flicker component from the captured image. Referring to FIG. 3A, the image sensor that generates the captured image employs the rolling shutter method, and each row differs in length of a light exposure time. More specifically, rows $r_{p1}$ exposed to light during a first light exposure time $t_{p1}$, and rows $r_{p2}$ exposed to light during a second light exposure time $t_{p2}$ that is shorter than the first light exposure time are alternatingly arrayed over the entire area of the image sensor. In FIG. 3B, an image $1003e1$ composed of pixels of the row $r_{p1}$ and an image $1003e2$ composed of pixels of the row $r_{p2}$ are illustrated. The length of the light exposure time differs between the image $1003e1$ and the image $1003e2$, and thus the integration section of the time-modulated brightness value differs, and thus the phase of the flicker component that appears in the array direction of the rows differs.

Therefore, relationships expressed in below equation 1 and equation 2 are established, for example. Note that $i_0(x, y)$ is brightness of each pixel of the original image 1001; $i_1(x, y)$ and $i_2(x, y)$ are brightnesses of each pixel of each of the image $1003e1$ and $1003e2$; $s_1(t)$ and $s_2(t)$ are shutter patterns (light exposure time) of each of the row $r_{p1}$ and the row $r_{p2}$; and $f(t)$ is a temporal modulation component of the brightness that is added as the flicker component 1005.

[Math. 1]

$$i_1(x,y) = \{s_1(t) * f(t)\} \cdot i_0(x,y) \quad \text{(Equation 1)}$$

$$i_2(x,y) = \{s_2(t) * f(t)\} \cdot i_0(x,y) \quad \text{(Equation 2)}$$

Of the above, $i_1(x, y)$ and $i_2(x, y)$ are the brightnesses observed in the captured image, and thus are already known.

Further, if $s_1(t)$ and $s_2(t)$ are known, equation 1 and equation 2 are solved as simultaneous equations, in order to calculate $i_0(x, y)$ and $f(t)$. To say conversely, unless $s_1(t)$ and $s_2(t)$ are known, $i_0(x, y)$ and $f(t)$ are not calculated. By utilizing this, only a limited device is enabled to take out the temporal modulation component of the brightness that is added as the flicker component 1005, as described later.

FIGS. 4 and 5 are diagrams for describing the specific method for extracting the flicker component from the captured image.

In an example illustrated in FIG. 4, the image sensor that generates the captured image performs random sampling in accordance with a sampling pattern P. Here, the random sampling is a method that sets a random (for example, not depending on row and column) order in the pixels in the captured image and performs light exposure (readout) for each pixel in that order. The image illustrated as the image 1009 is obtained by capturing the original image 1001 to which the flicker component f(t) is added, by using this image sensor. The brightness fluctuation of each pixel by the flicker component f(t) is also generated in the image 1009, but the order of light exposure to the pixels is at random, and thus the brightness noise distributed at random is observed, instead of the stripe pattern as in the image 1003 illustrated in FIG. 2, for example.

Here, when the image 1009 illustrated in FIG. 4 is sorted in the order in which the light exposure is performed in accordance with the sampling pattern P, an image 1007 is obtained. In the image 1007, the pixels of the image 1009 are arrayed in the order of the light exposure. Thus, in the image 1007, the brightness fluctuation of each pixel by the flicker component f(t) is observed as the stripe pattern, in the same way as the image 1003 illustrated in FIG. 2 for example. Here, in the image 1007, the brightness component of the original image 1001 which is the object is the random noise for the flicker component f(t), as opposed to the image 1009. Here, if the flicker component f(t) is identified by some sort of method, an image which is closer to the original image 1001 can be obtained, by removing the flicker component f(t) from the image 1007 and in addition setting the pixel location back to the original position in the same way as the image 1009.

As a method for estimating the flicker component f(t) in the above example, when the length of the light exposure time differs in each pixel for example, the same analysis as the example illustrated in the above FIGS. 3A and 3B is performed with regard to the image 1007 that is generated with each light exposure time, in order to identify the brightness component and the flicker component f(t) of the original image 1001. Also, as described later, the information indicating the flicker component f(t) may be given separately.

In an example illustrated in FIG. 5, the image sensor that generates the captured image performs compression sampling in accordance with a sampling matrix S. Here, the compression sampling is a method that restores the original information from pixel values of fewer samples than in a normal situation, in obtaining complete information of the object. For example, there is a proposed method that restores the original pixels from the pixel information that is obtained by sampling the entire image sparsely by a fewer number than the number of all pixels, or restores the original pixel from an output value that is obtained by adding some of the pixel values that are sampled sparsely. The sampling matrix S illustrated in FIG. 5 is a matrix for converting the original image 1001 (vector expression E of the pixel values), which is the object, to a captured image 1011 (vector expression I of the pixel values), as in following equation 3, in such compression sampling. Note that n indicates a noise component. Here, two or more rows that include a non-zero element can exist in the sampling matrix S. In this case, two or more pixel values included in the vector E (object) are added to make up a pixel value of the vector I (captured image). Thus, it is difficult to restore the vector E (object) from the vector I (captured image) in a usual method, but in the compression sampling, the vector E is estimated from the vector I by below equation 4 for example, by utilizing image sparsity. Note that publicly known various methods can be used as well, in the restoration of the object in the compression sampling.

[Math. 2]

$$I = SE + n \quad \text{(Equation 3)}$$

$$\hat{E} = \arg \min \{\|1 - SE\|_2 + \|E\|_0\} \quad \text{(Equation 4)}$$

In the example illustrated in FIG. 5, the image 1011 is obtained by capturing the original image 1001 to which the flicker component f(t) is added, by the image sensor that performs this compression sampling. In the image 1011, the brightness fluctuation of each pixel by the flicker component f(t) changes in a complicated manner by the calculation for restoring the object from the above captured image, and is observed as the brightness noise that is distributed at random as a result. Here, if the flicker component f(t) is identified by some sort of method, an image 1013 which is closer to the original image 1001 can be obtained by removing the flicker component f(t) included in the vector E of the object on the basis of the vector I of the captured image and the sampling matrix S and in addition estimating the vector E of the object by using above equation 4 or the like.

2. Specific Embodiment

Next, several specific embodiments of the present disclosure will be described.

2-1. First Embodiment

FIG. 6 is a diagram illustrating an exemplary configuration of a system according to a first embodiment of the present disclosure. Referring to FIG. 6, a system 10a includes an imaging apparatus 100 and a screen device 200a. The system 10a may further include a server 300. The imaging apparatus 100 is a terminal device that has an imaging function, and can be a smartphone, a digital camera, a tablet, or the like for example. The screen device 200a electronically displays an image of content such as a movie. More specifically, the screen device 200a may display an image by a light emitting display device like an LCD, and may display an image by a projection display device, for example. In this case, the flicker component is generated in the captured image that includes the image, by modulating the light for displaying the image by the screen device 200a. The screen device 200a supplies key information for removing such a flicker component to the imaging apparatus 100. Note that, in the following, a case in which the system 10a is configured with the imaging apparatus 100 and the screen device 200a will be described first, and a case in which the server 300 is included in the system will be described later as an exemplary variant.

In the illustrated example, the flicker component that is described with reference to FIG. 1 in the above is superimposed on the displaying light of the image that is displayed on the screen device 200a. For example, the flicker component is generated by the screen device 200a that changes, in a predetermined pattern, the brightness of the light emission element (backlight, etc.) in the light emitting display device and the brightness of the light source in the projection display device. Also, for example, the flicker component may be generated by changing the brightness value in advance in a predetermined pattern (regardless of original content), in the image data displayed by the screen device 200a. As described with reference to FIG. 1, even if the screen device 200a is captured by the camera (imaging apparatus) of the imaging apparatus 100, the stripe pattern is generated in a part of the image, and the brightness of the moving image changes in each frame, due to the flicker component, and thus the obtained captured image is unable to be viewed. In the system 10a, prevention of secret videoing of the content displayed on the screen device 200a is achieved by this configuration.

However, in some cases, image capturing of content by the imaging apparatus 100 or the like may be authorized to a user who has obtained authorization by paying a price to a content provider, for example. For such cases, a scheme for removing a flicker component from the captured image is introduced into the imaging apparatus 100 in the system 10a. Such a scheme will further be described with reference to a functional configuration of the imaging apparatus 100 and the screen device 200a in the following.

FIG. 7 is a block diagram illustrating an exemplary functional configuration of the imaging apparatus according to the first embodiment of the present disclosure. Referring to FIG. 7, the imaging apparatus 100 includes an imaging unit 101, an imaging control unit 103, an image acquisition unit 105, a key information acquisition unit 107, a modulation component extraction unit 109, a modulation component removing unit 111, and an image output unit 113. The imaging apparatus 100 may further include a key information receiving unit 115. In the following, the configuration of each unit will be described.

The imaging unit 101 includes an image sensor, and generates image data by capturing an image of a real space. In the below description, image data that is generated by the imaging unit 101 or an image indicated by the image data is referred to as a captured image. In the present embodiment, the image displayed on the screen device 200a is included in the image of the real space. The imaging unit 101 can further include an image processing circuit for performing analog/digital conversion of the image or the like. The imaging unit 101 is controlled by the imaging control unit 103. The imaging control unit 103 is a control device that controls a timing of light exposure of the pixels in the imaging unit 101 or the like, for example.

The image acquisition unit 105 acquires a captured image generated by the imaging unit 101. As described above, the flicker component is included in the captured image acquired by the image acquisition unit 105. The key information acquisition unit 107 acquires the key information for extracting the flicker component, that is, the light temporal modulation component included in the captured image. The key information may be acquired from the key information receiving unit 115, and may be acquired from the imaging control unit 103, for example. The modulation component extraction unit 109 extracts the flicker component from the captured image on the basis of the key information. The modulation component removing unit 111 removes the flicker component from the captured image on the basis of the extraction result of the flicker component. The above image acquisition unit 105, the key information acquisition unit 107, the modulation component extraction unit 109, and the modulation component removing unit 111, which perform calculation for data acquisition and image processing can be configured with a processor such as a central processing unit (CPU) included in the imaging apparatus 100 that operates in accordance with a program that is stored in a memory or a storage, for example.

The image from which the flicker component has been removed is output by the image output unit 113. The image output unit 113 may include a display device that displays the image, for example. Also, the image output unit 113 may include a record device that stores the image in a memory or a storage. Here, the image may be stored in the memory or the storage inside the imaging apparatus 100, and may be written into a removable medium. Also, the image output unit 113 may include a communication device that uploads the image to a server (which can be different from the server 300) via a network and transmits the image to another user.

In the present embodiment, the key information acquired by the key information acquisition unit 107 may include information indicating a pattern of the flicker component, for example. For example, when the flicker component is cyclic fluctuation of the brightness, if the key information indicating the cycle or the frequency of the fluctuation is given, the modulation component extraction unit 109 can extract the flicker component from the captured image. Note that, in FIGS. 2 to 4 etc. for example, the flicker component is illustrated as a component that fluctuates in a constant cycle for simplicity, but for example the frequency of the flicker component may change temporally, and a component that is not cyclic fluctuation may be mixed in the flicker component, when the purpose is prevention of secret videoing as in the present embodiment. In this case as well, for example, if the temporally changing frequency is reported sequentially as the key information, or if the waveform itself of the flicker component is given as the key information, the extraction of the modulation component by the modulation component extraction unit 109 is enabled.

Alternatively, the key information may include information relevant to control of the imaging unit 101. For example, as in the example described with reference to FIGS. 3A and 3B in the above, when the image sensor included in the imaging unit 101 employs the rolling shutter method, and the length of the light exposure time differs in each row, the key information may include information indicating the light exposure time. To say more specifically, in this case, the captured image includes a first region (row $r_{p1}$ in the example of FIG. 3A) that is captured in the first light exposure time, and a second region (row $r_{p2}$ in the example of FIG. 3A) that is captured in the second light exposure time that differs from the first light exposure time. Here, the first region and the second region are not necessarily rows (may be columns, and may be another random pattern) but are arrayed over the entire area of the captured image. Thereby, a plurality of images captured at different light exposure times can be obtained, like the image 1003e1 and the image 1003e2 in the example of FIG. 3B.

In this case, the key information includes at least one of the first light exposure time or the second light exposure time. When the key information includes both of the first light exposure time and the second light exposure time, the brightness of each pixel of the original image and the flicker component can be calculated on the basis of equation 1 and equation 2 described in the above. Also, for example, even when the key information includes only the first light exposure time, if the first light exposure time ($t_{p1}$ illustrated in FIG. 3A) is an integer multiple of the cycle of the flicker component f(t), the flicker component is canceled by integration in the image of the first region, and thus following equation 5 is established. Note that k is an arbitrary integer. If equation 5 is assigned to above equation 2, below equation 6 is obtained. The flicker component f(t) can be calculated, by assigning the brightnesses $i_1(x, y)$ and $i_2(x, y)$ of the image captured in the respective light exposure times and the shutter pattern (light exposure time) $s_2(t)$ to equation 6.

[Math. 3]

$$i_1(x, y) = k \cdot i_0(x, y) \quad \text{(Equation 5)}$$

$$i_2(x, y) = (s_2(t) * f(t)) \cdot \frac{i_1(x, y)}{k} \quad \text{(Equation 6)}$$

Also, for example, as in the example described with reference to FIG. 4 in the above, when the image sensor included in the imaging unit 101 performs the random sampling, the key information may include information that indicates the pattern (sampling pattern P in the example of FIG. 4) of the random sampling. As described already, in the case of the captured image generated by the random sampling, the flicker component becomes the brightness noise distributed at random, and thus is difficult to remove as it is. Here, as in the example illustrated in FIG. 4, if the pixels are sorted in the order in which the light exposure is performed in accordance with the sampling pattern P, the flicker component that appears as the cyclic brightness fluctuation in the sorted image can be removed. That is, for example, even if the flicker component itself is a simple pattern, the flicker component is difficult to remove without the information indicating the sampling pattern P, and the noise remains in the captured image. Thus, in an example of the present embodiment, the key information indicating the sampling pattern of the random sampling is acquired by the key information acquisition unit 107. Thereby, the modulation component extraction unit 109 can perform the extraction of the flicker component with regard to the pixels that are sorted in the order in which the light exposure is performed, and the modulation component removing unit 111 can remove the extracted flicker component and in addition set the pixels back to the original positions in accordance with the sampling pattern. Note that the information indicating the pattern of the flicker component may further be included in the key information, in the same way as the above example. Alternatively, if the flicker component itself is a simple pattern, and the modulation component removing unit 111 can remove the flicker component even without the pattern information, the information indicating the pattern of the flicker component is needless to be included in the key information.

Also, for example, as in the example described with reference to FIG. 5 in the above, when the image sensor included in the imaging unit 101 performs the compression sampling, the key information may include the information indicating the sampling matrix of the compression sampling. As described already, in the case of the captured image generated by the compression sampling, the flicker component changes in a complicated manner by the calculation for restoring the object from the captured image, and thus is difficult to remove as it is. Here, as in the example illustrated in FIG. 5, if the vector I of the captured image is identified on the basis of the sampling matrix S, the flicker component that appears as the cyclic brightness fluctuation in the image expressed as the vector I can be removed. That is, for example, even if the flicker component itself is a simple pattern, the flicker component is difficult to remove without the key information indicating the sampling matrix S, and the noise remains in the captured image. Thus, in an example of the present embodiment, the information indicating the sampling matrix of the compression sampling is acquired by the key information acquisition unit 107. Thereby, the modulation component extraction unit 109 can identify the vector I of the captured image and in addition perform the extraction of the flicker component, and the modulation component removing unit 111 can remove the flicker component extracted and in addition estimate the vector E of the object from the vector I of the captured image in accordance with the sampling matrix. Note that, in the present example as well, the information indicating the pattern of the flicker component may further be included in the key information, and the information indicating the pattern of the flicker component is needless to be included in the key information, in the same way as the example of the above random sampling.

The key information as in the example described in the above is received from the outside of the imaging apparatus 100 by the key information receiving unit 115, for example. The key information receiving unit 115 includes the communication device that receives the key information by the wireless communication, for example. In this case, the communication device receives the key information by the communication executed with the server 300 directly or via the network. Alternatively, the key information receiving unit 115 may include an imaging apparatus that reads a visible code obtained by encoding the key information. The visible code is known as a bar code, a two-dimensional code, and the like, for example. The imaging apparatus that configures the key information receiving unit 115 may be shared by the imaging unit 101. Also, for example, the key information receiving unit 115 may include a reader of a removable recording medium that records the key information. The removable recording medium can be a universal serial bus (USB) memory, or a subscriber identity module (SIM) card, and the like, for example.

The key information received from the outside (the server 300) by the key information receiving unit 115 can include information indicating the pattern of the flicker component for example, and may include information relevant to the control of the imaging unit 101, such as the light exposure time of each region, the pattern of the random sampling, and the sampling matrix of the compression sampling. In a usual case, when the captured image is generated by the imaging unit 101, the information relevant to the control of the imaging unit 101 is not supplied from the imaging control unit 103 to another part. Thus, it is not easy to remove the flicker component from the captured image acquired by the image acquisition unit 105. Here, for example, when the server 300 extracts information such as the light exposure time, the sampling pattern, or the sampling matrix set in the imaging control unit 103 from specification information or the like of the imaging apparatus 100 and transmits these information only to the imaging apparatus 100 of the users that have obtained the authorization, the key information acquisition unit 107 can acquire appropriate key information via the key information receiving unit 115 and enables the extraction of the flicker component by the modulation component extraction unit 109 and the removal of the flicker component by the modulation component removing unit 111, only at the imaging apparatus 100 of those users.

As another example, the key information acquisition unit 107 may acquire the key information internally from the imaging control unit 103 or the like. In this case, the key information can include the information relevant to the control of the imaging unit 101, such as, the light exposure time of each region of the captured image, the pattern of the random sampling, the sampling matrix of the compression sampling, which are set in the imaging control unit 103. Alternatively, the key information may include information indicating the pattern of the flicker information, which is stored in the memory or the storage of the imaging apparatus 100. In the imaging apparatus 100 that includes this key information acquisition unit 107, the flicker component can be removed from the captured image, without the information supplied from the outside. However, as described above, it is not general to supply the information relevant to the control of the imaging unit 101 from the imaging control unit 103 to another part. Also, when the pattern of the flicker information is utilized, it is necessary to store the pattern of the flicker information in the memory or the storage of the imaging apparatus 100 in advance. Thus, for example, a configuration in which the key information acquisition unit 107 acquires the key information internally can be useful when applied to the imaging apparatus 100 (which may be a tablet, a digital camera, or the like) that is lent to the user only within an inside area of a movie theater or an exhibition hall for example.

Figure 8:
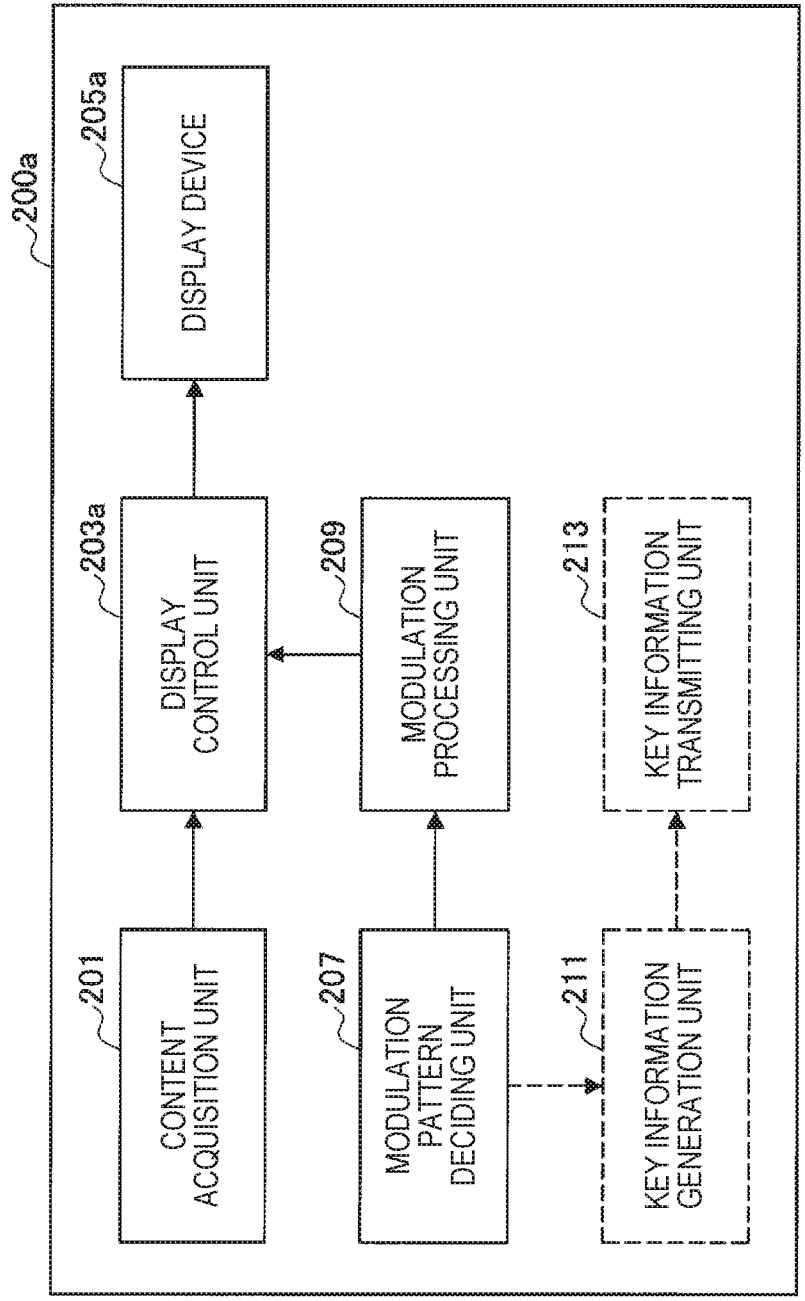
FIG. 8 is a block diagram illustrating an exemplary functional configuration of a screen device according to the first embodiment of the present disclosure.

FIG. 8 is a block diagram illustrating an exemplary functional configuration of the screen device according to the first embodiment of the present disclosure. Referring to FIG. 8, the screen device 200*a* includes a content acquisition unit 201, a display control unit 203*a*, a display device 205*a*, a modulation pattern deciding unit 207, and a modulation processing unit 209. The screen device 200*a* may further include a key information generation unit 211, and a key information transmitting unit 213. In the following, the configuration of each unit will be described. Note that the display control unit 203*a*, the modulation pattern deciding unit 207, the modulation processing unit 209, and the key information generation unit 211, which perform calculation for data acquisition, image processing, and the like can be configured with a processor such as a CPU included in the screen device 200*a* that operates in accordance with a program stored in the memory or the storage, for example.

The content acquisition unit 201 acquires the content displayed by the display device 205*a*. The content acquisition unit 201 may include a communication device that receives the content from another device, and may read the content from the memory or the storage of the screen device 200*a* or the removable recording medium, for example. The content is displayed by the display device 205*a* in accordance with the control by the display control unit 203*a*. The display device 205*a* may be a light emitting display device like an LCD for example as described above, and may be a projection display device. In either case, the flicker component is superimposed on the observed image, by changing the brightness of the displaying light of the image in a predetermined pattern, for example. The pattern of the flicker component is decided by the modulation pattern deciding unit 207, and the modulation processing unit 209 controls the display control unit 203*a* to superimpose the flicker component. The modulation pattern deciding unit 207 decides the pattern of the flicker component, in accordance with the information stored in advance in the memory or the storage of the screen device 200*a*, for example. Also, the modulation pattern deciding unit 207 may decide the pattern of the flicker component at random, each time the content is displayed. Note that the fluctuation of the brightness in the flicker component is generated in a shorter cycle than the cycle in which the eyes of the person can perform recognition, and thus has no problem in the audience who visually confirm the image displayed on the display device 205*a* directly.

The key information generation unit 211 generates the key information supplied to the imaging apparatus 100 in accordance with the pattern of the flicker component decided by the modulation pattern deciding unit 207, for example. In this case, the generated key information can be information indicating the pattern of the flicker component. Also, the key information generation unit 211 may generate the key information, regardless of the pattern decided by the modulation pattern deciding unit 207. In this case, the generated key information may include the information relevant to the control of the imaging unit 101, such as the light exposure time of each region, the pattern of the random sampling, and the sampling matrix of the compression sampling, for example. As described above, these information is not generally supplied inside the imaging apparatus 100, and thus the key information indicating these information acquired from the specification information or the like of the imaging apparatus 100 by the key information generation unit 211 enables the removal of the flicker component by the modulation component removing unit 111 only in the imaging apparatus 100 to which those are transmitted.

The key information generated by the key information generation unit 211 is transmitted to the imaging apparatus 100 by the key information transmitting unit 213. The key information transmitting unit 213 can include a communication device that transmits the key information by wireless communication, a display device that displays the visible code obtained by encoding the key information, or a writer that records the key information in the removable recording medium, etc., for example, depending on the configuration of the key information receiving unit 115 of the imaging apparatus 100.

2-2. Second Embodiment

Figure 9:
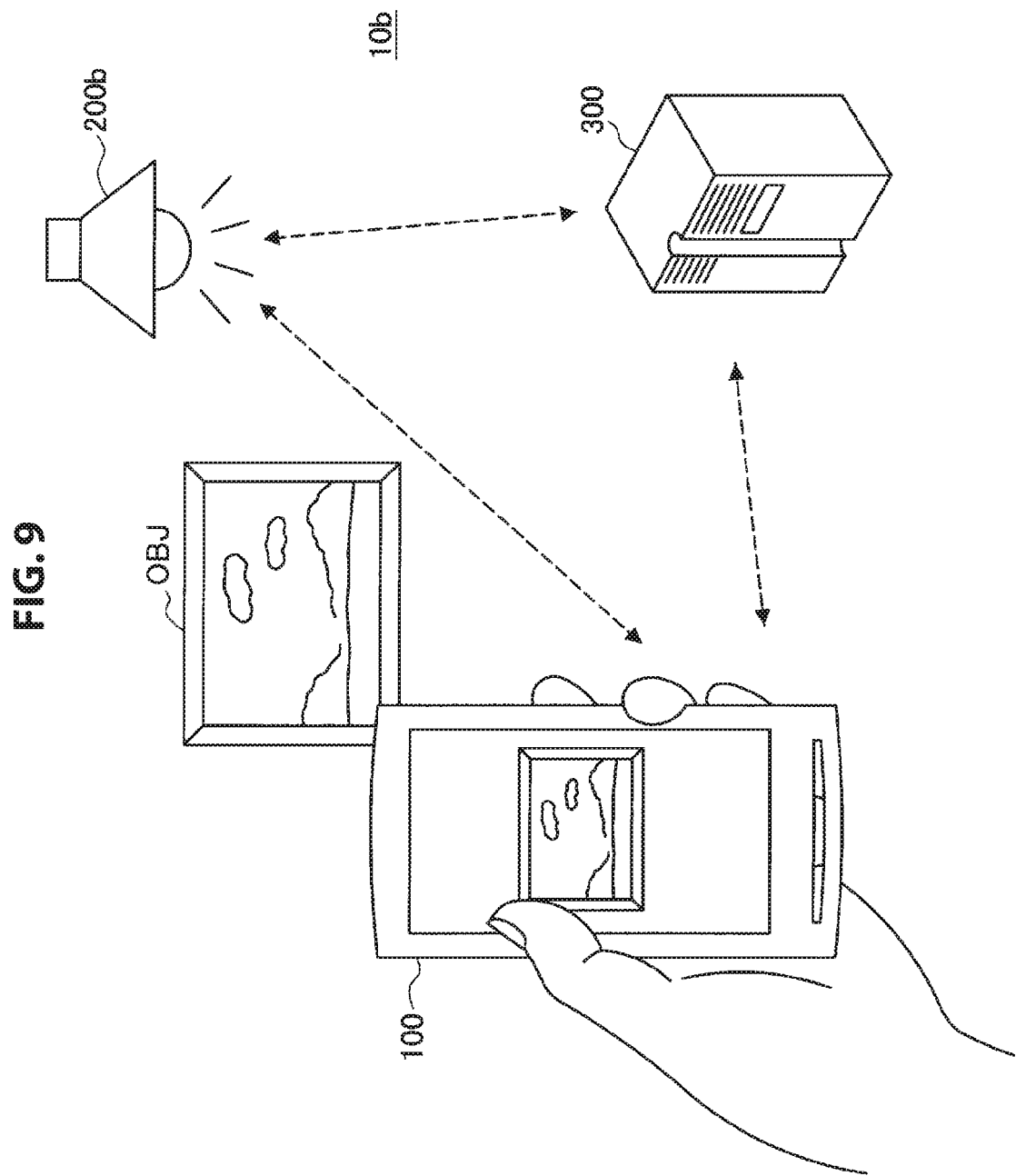
FIG. 9 is a diagram illustrating an exemplary configuration of a system according to a second embodiment of the present disclosure.

FIG. 9 is a diagram illustrating an exemplary configuration of a system according to a second embodiment of the present disclosure. Referring to FIG. 9, a system 10*b* includes an imaging apparatus 100 and a lighting device 200*b*. The system 10*b* may further include a server 300. Note that the configuration of the imaging apparatus 100 is the same as the above first embodiment, and thus duplicate description will be omitted. The lighting device 200*b* illuminates a surrounding area of an object OBJ that is captured by the imaging apparatus 100. In this case, the light radiated by the lighting device 200*b*, that is, the environmental light of the object OBJ is modulated, and thereby the flicker component is generated in the captured image that includes the object OBJ. The lighting device 200*b* supplies the key information for removing such a flicker component to the imaging apparatus 100. Note that, in the following, a case in which the system 10*b* is configured with the imaging apparatus 100 and the lighting device 200*b* will be described first, and a case in which the server 300 is included in the system will be described later as an exemplary variant.

In the illustrated example, the flicker component described with reference to FIG. 1 in the above is superimposed on illumination light with which the lighting device 200*b* illuminates the object OBJ. For example, the flicker component is generated by the lighting device 200*b* that changes the brightness of a light source in a predetermined pattern. As described with reference to FIG. 1, even if the object OBJ is captured by the camera (imaging apparatus) of the imaging apparatus 100, a stripe pattern can be seen on the object OBJ in the captured image, and the brightness of the object OBJ changes in each frame, due to the flicker component, and thus the obtained captured image is unable to be viewed. In the system 10b, prevention of secret videoing of the object OBJ, which can be an exhibited object, an article, or the like, is achieved by this configuration, for example.

In the present embodiment as well, image capturing of the object OBJ by the imaging apparatus 100 is authorized to the user that has obtained authorization by paying the price to the provider of the exhibited object. Hence, in the system 10b as well, the scheme for removing the flicker component from the captured image in the same way as the above first embodiment is introduced in the imaging apparatus 100. In the following, the present embodiment will further be described with reference to a functional configuration of the lighting device 200b that differs from the first embodiment.

Figure 10:
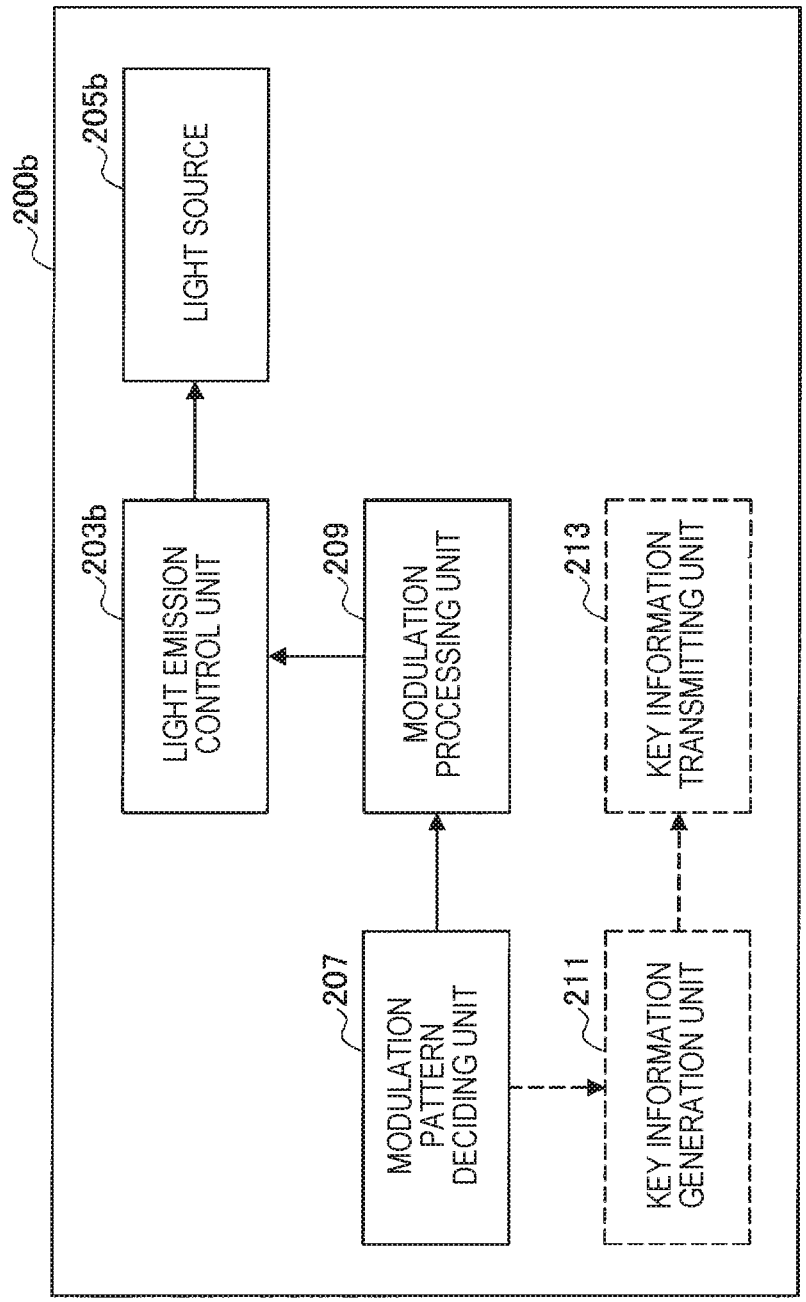
FIG. 10 is a block diagram illustrating an exemplary functional configuration of a lighting device according to the second embodiment of the present disclosure.

FIG. 10 is a block diagram illustrating an exemplary functional configuration of the lighting device according to the second embodiment of the present disclosure. Referring to FIG. 10, the lighting device 200b includes a light emission control unit 203b, a light source 205b, a modulation pattern deciding unit 207, and a modulation processing unit 209. The lighting device 200b may further include a key information generation unit 211 and a key information transmitting unit 213. In the following, the configuration of each unit will be described. Note that the light emission control unit 203b, the modulation pattern deciding unit 207, the modulation processing unit 209, and the key information generation unit 211, which perform calculation for controlling the illumination light, can be configured with a processor such as a CPU included in the lighting device 200b which operates in accordance with a program stored in a memory or a storage, for example. Also, the functional configuration of the lighting device 200b is needless to be contained in the main body of the lighting illustrated in FIG. 9 necessarily, and may be contained in a control device that remotely controls the lighting by wired or wireless communication. The modulation pattern deciding unit 207, the modulation processing unit 209, the key information generation unit 211, and the key information transmitting unit 213 are the same as those described as the functional configuration of the screen device 200a in the above first embodiment, and thus duplicate description will be omitted.

The light emission control unit 203b controls the illumination intensity of the light source 205b. The light source 205b can be a light source that utilizes a light emitting diode (LED) and an organic electro-luminescence (EL), for example. In either case, for example, the light emission control unit 203b can fluctuate the illumination intensity of the illumination light, by fluctuating the voltage supplied to the light source 205b. In the present embodiment, the light emission control unit 203b is controlled by the modulation processing unit 209, and thereby the illumination intensity of the illumination light by the light source 205b changes in a predetermined pattern. Thereby, the flicker component is generated in the captured image that includes the object OBJ, as described above. Note that the fluctuation of the illumination intensity in the flicker component is generated in a shorter cycle than the cycle that the eyes of the person can perform recognition, and thereby has no problem in the audience who visually confirm the object OBJ directly.

In the present embodiment, with the above configuration, the flicker component is superimposed on the captured image that includes the object OBJ captured by the imaging apparatus 100, and the image capturing of the object OBJ becomes difficult in the imaging apparatus 100 that does not acquire the key information. On the other hand, the imaging apparatus 100 that has acquired the key information can remove the flicker component from the captured image and obtain a utilizable image of object OBJ. Although the present embodiment has a different scheme for generating the flicker component from the above first embodiment, the flicker component recorded in the captured image is the same as the first embodiment, and thus various types of information described in the first embodiment can be utilized as the key information for the extracting and removing the flicker component.

2-3. Example in which Server is Included

Figure 11:
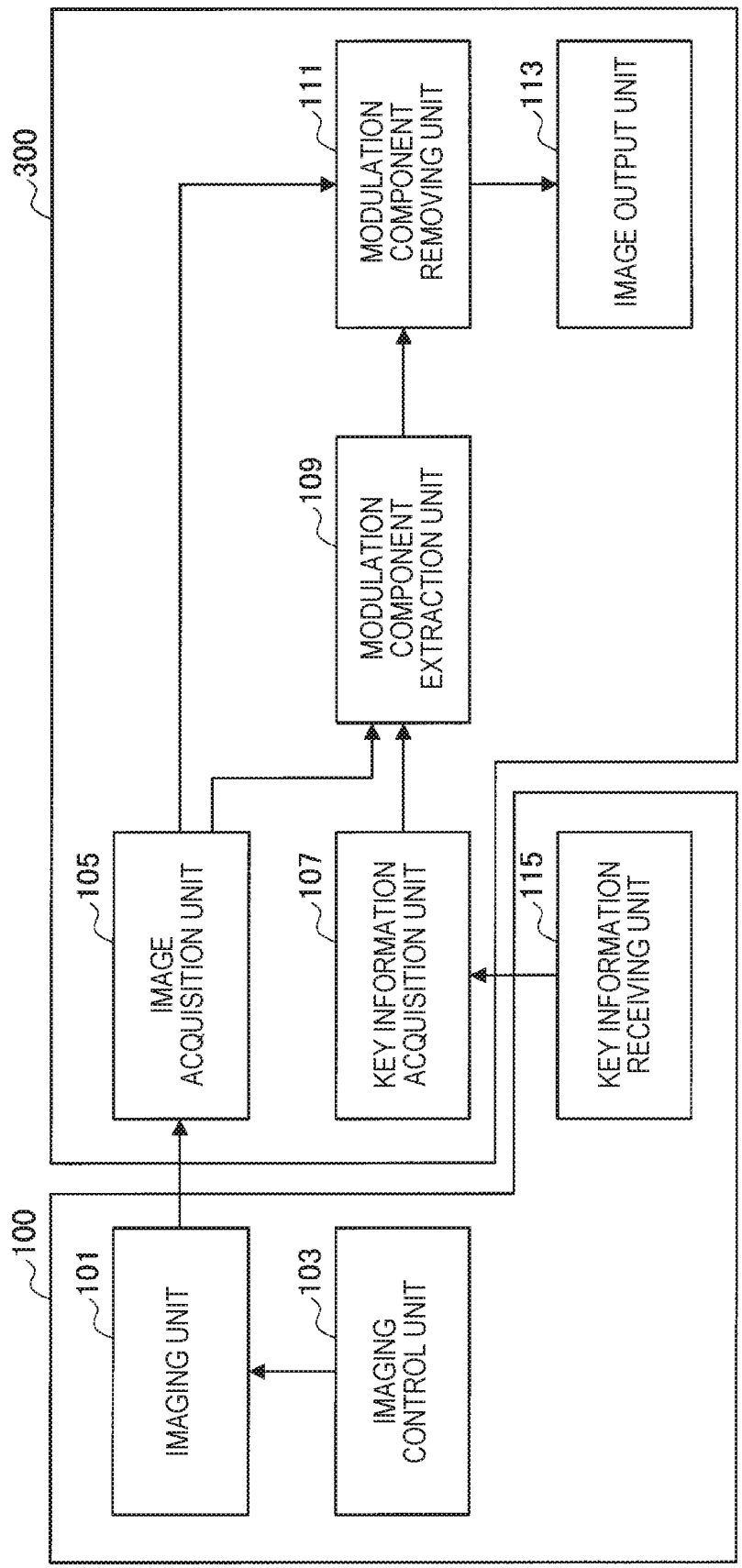
FIG. 11 is a block diagram for describing an example in which a server is included in a system, in the first and second embodiments of the present disclosure.

FIG. 11 is a block diagram for describing an example in which the server 300 is included in the systems 10a, 10b in the above first and second embodiments of the present disclosure. Referring to FIG. 11, the image acquisition unit 105, the key information acquisition unit 107, the modulation component extraction unit 109, the modulation component removing unit 111, and the image output unit 113, among the functional configuration of the imaging apparatus 100 described with reference to FIG. 7 in the above, are configured with the server 300.

The illustrated example can be a case in which the captured image generated by the imaging unit 101 of the imaging apparatus 100 is uploaded to the server 300, while including the flicker component, and the process for removing the flicker component on the basis of the key information in the server 300 is executed, for example. Here, the key information receiving unit 115 is included in the imaging apparatus 100, in the present example. Thus, the key information is acquired by the imaging apparatus 100 at the time of image capturing, and is uploaded to the server 300 together with the captured image. In this case, the flicker component is removed posteriori from the captured image uploaded to the server 300, for example, by the imaging apparatus 100 that executes the near field communication (NFC) to receive the key information at the site of the movie theater and the exhibition hall, or reads the code in which the key information is encoded, or connects the removable recording medium that records the key information to the imaging apparatus 100, without performing a procedure such as online registration.

Figure 12:
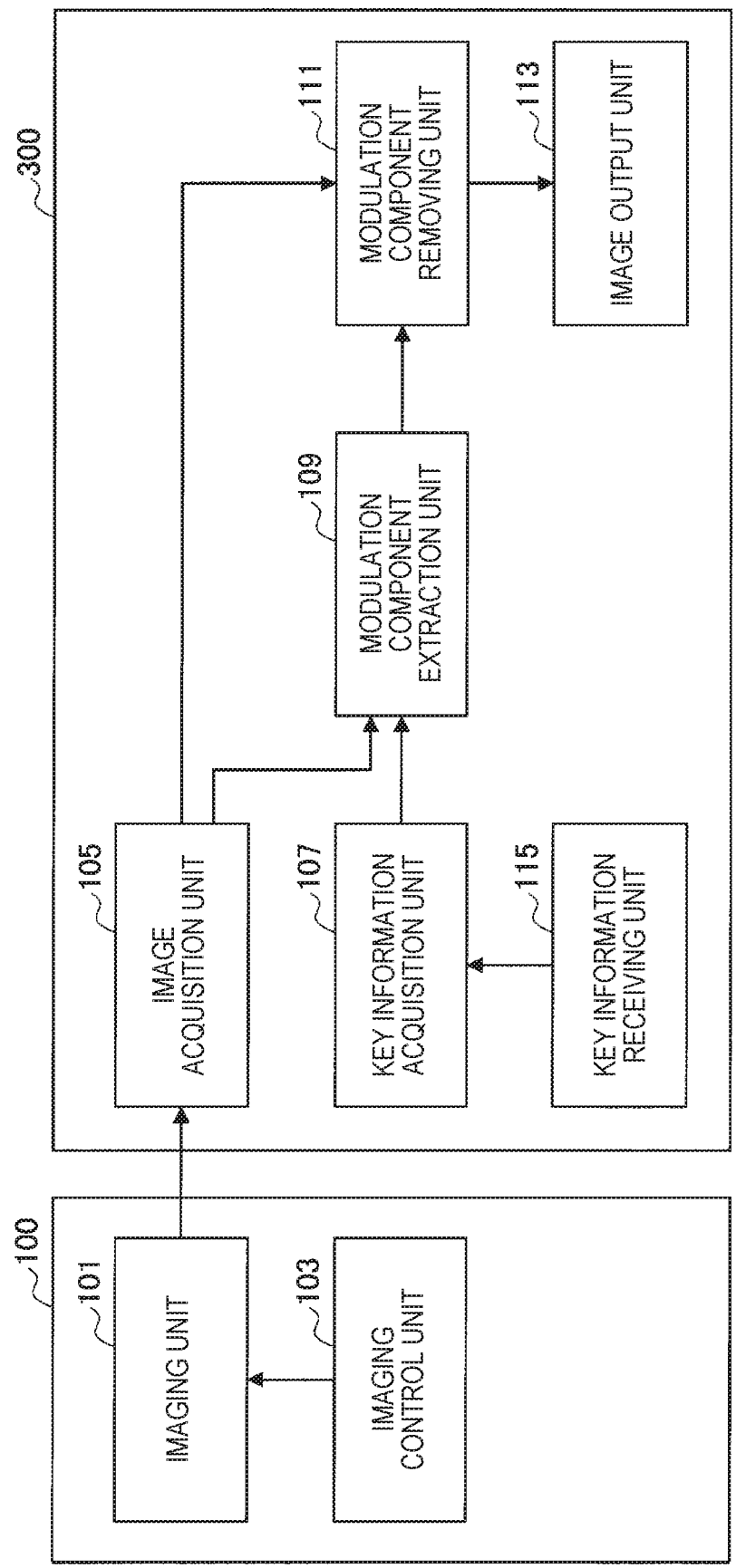
FIG. 12 is a block diagram for describing a further exemplary variant of an example of FIG. 11.

FIG. 12 is a block diagram for describing a further exemplary variant of the example of FIG. 11. Referring to FIG. 12, the key information receiving unit 115, among the configuration of the imaging apparatus 100 illustrated in FIG. 11, is moved into the server 300. The illustrated example is the same as the example of FIG. 11 in that the captured image generated by the imaging unit 101 of the imaging apparatus 100 is uploaded to the server 300, while including the flicker component. However, in the illustrated example, the key information for removing the flicker component of the captured image is not acquired by the imaging apparatus 100, and thus the key information is not uploaded to the server 300 from the imaging apparatus 100. The key information is received from the screen device 200a or the lighting device 200b for example, by the key information receiving unit 115 in the server 300. Thus, in the illustrated example, a special process is not requested additionally, when the image is captured by the imaging apparatus 100. Even so, for example, if authorization for capturing an image and the object OBJ that are displayed on the screen device 200a is given to the account of the user that uploads the captured image to the server 300 (for example, may be purchased online), the flicker component is removed posteriori from the captured image uploaded to the server 300.

2-4. Example that Demodulates Flicker Component

Figure 13:
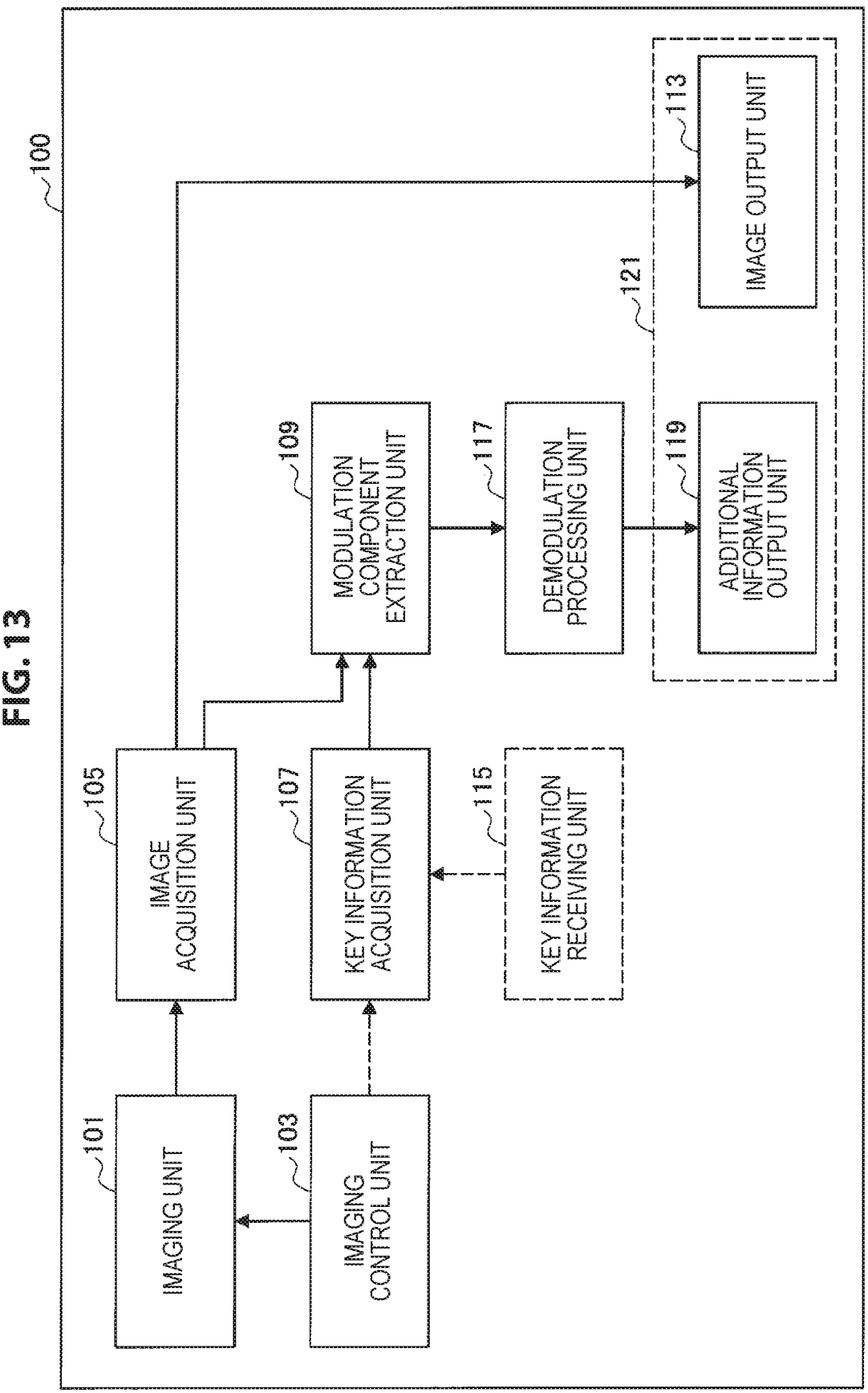
FIG. 13 is a block diagram for describing an example that demodulates a flicker component instead of removing the flicker component, in the first and second embodiments of the present disclosure.

FIG. 13 is a block diagram for describing an example that demodulates the flicker component, instead of removing the flicker component, in the above first and second embodiments of the present disclosure. Referring to FIG. 13, the imaging apparatus 100 includes an imaging unit 101, an imaging control unit 103, an image acquisition unit 105, a key information acquisition unit 107, a modulation component extraction unit 109, an image output unit 113, a demodulation processing unit 117, and an additional information output unit 119. The imaging apparatus 100 may further include a key information receiving unit 115. In the illustrated example, the demodulation processing unit 117 and the additional information output unit 119 is provided in the imaging apparatus 100, unlike the above examples. In the following, these functional configurations will further be described.

The demodulation processing unit 117 acquires additional information of the captured image, by demodulating the flicker component extracted from the captured image by the modulation component extraction unit 109. As described above, in the present embodiment, the flicker component is a light temporal modulation component included in the captured image. For example, in the screen device 200a and the lighting device 200b in the above embodiment, the modulation processing unit 209 can modulate the amplitude and the frequency of the brightness fluctuation in such a manner that the additional information is encoded. The demodulation processing unit 117 demodulates the extracted flicker component, and thereby can take out the encoded additional information. Here, the additional information may be any information, and may be information related to the captured image, for example. More specifically, the additional information that is encoded into the flicker component in the system 10a may include information such as subtitle and commentary relevant to content such as a movie displayed on the screen device 200a, for example. Also, for example, the additional information that is encoded into the flicker component in the system 10b may include detailed description relevant to the object OBJ and the information such as a map of an exhibition hall.

The additional information output unit 119 outputs the additional information acquired by the demodulation processing unit 117. For example, the additional information output unit 119 includes a display device that outputs the additional information as an image. Also, the additional information output unit 119 may include various types of output devices, such as a speaker that outputs the additional information as sound and a vibrator that outputs the additional information as vibration. Alternatively, the additional information output unit 119 may include a communication device that transmits the additional information to an external device such as a server. For example, when the additional information is output as an image, and the captured image acquired by the image acquisition unit 105 is output as an image by the image output unit 113, the additional information output unit 119 and the image output unit 113 may be configured with the same display device 121. In this case, in the display device, the information acquired as the additional information may be superimposed and displayed on the image of the content displayed on the screen device 200a and the captured image (live view image) that includes the object OBJ.

When the imaging apparatus 100 demodulates the flicker component as described above, the key information may be included in the additional information encoded into the flicker component. More specifically, for example, the key information acquisition unit 107 may acquire the key information for extracting the flicker component included in the subsequent captured image, from the additional information of the preceding captured image. Thereby, for example, the imaging apparatus 100 that has extracted and demodulated the flicker component by using the key information that is supplied separately at the beginning can continuously acquire the key information from the additional information. Thus, even when the pattern of the flicker component changes in temporal sequence, if the key information indicating the pattern at the first time point is supplied separately, the key information representing the pattern that changes thereafter can be transmitted by the modulation of the flicker component.

Note that the modulation component removing unit 111 is not included in the imaging apparatus 100, in the example illustrated in FIG. 13. Thus, the captured image acquired by the image acquisition unit 105 is output by the image output unit 113, while including the flicker component. For example, when the screen device 200a and the lighting device 200b generate the flicker component with a main purpose of transmission of the additional information rather than prevention of secret videoing of the image and the object, the flicker component is needless to make the captured image unable to be viewed as illustrated in the example of FIG. 1 necessarily, but may be a simpler pattern. In that case, the captured image can be output, while including the flicker component.

Figure 14:
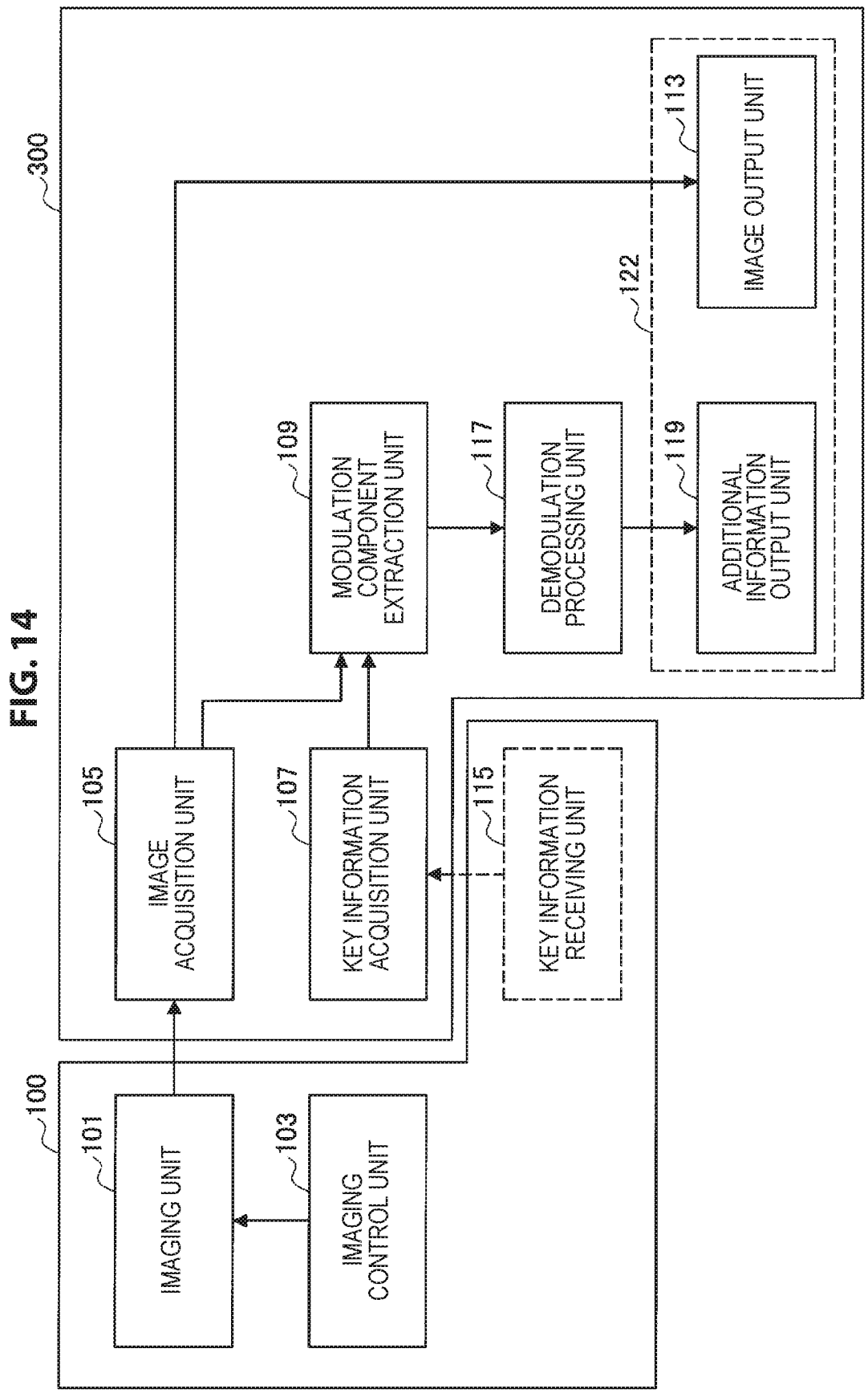
FIG. 14 is a block diagram for describing an example in which a server is included in a system, in an example of FIG. 13.

FIG. 14 is a block diagram for describing an example in which the server 300 is included in the systems 10a, 10b in the example of FIG. 13. Referring to FIG. 14, the image acquisition unit 105, the key information acquisition unit 107, the modulation component extraction unit 109, the image output unit 113, the demodulation processing unit 117, and the additional information output unit 119, among the functional configuration of the imaging apparatus 100 described with reference to FIG. 13 in the above, are configured with the server 300.

The illustrated example can be a case in which the captured image generated by the imaging unit 101 of the imaging apparatus 100 is uploaded to the server 300, while including the flicker component, and a process is executed to extract and demodulate the flicker component on the basis of the key information in the server 300, in the same way as the example of the above FIG. 11, for example. In the present example, the image output unit 113 and the additional information output unit 119 may be configured with a record device 122 that stores the captured image and the additional information in the memory or the storage of the server 300 in association with each other, for example. Also, in the illustrated example as well, an exemplary variant in which the key information receiving unit 115 is configured with the server 300 as in the example illustrated in FIG. 12 in the above.

Figure 15:
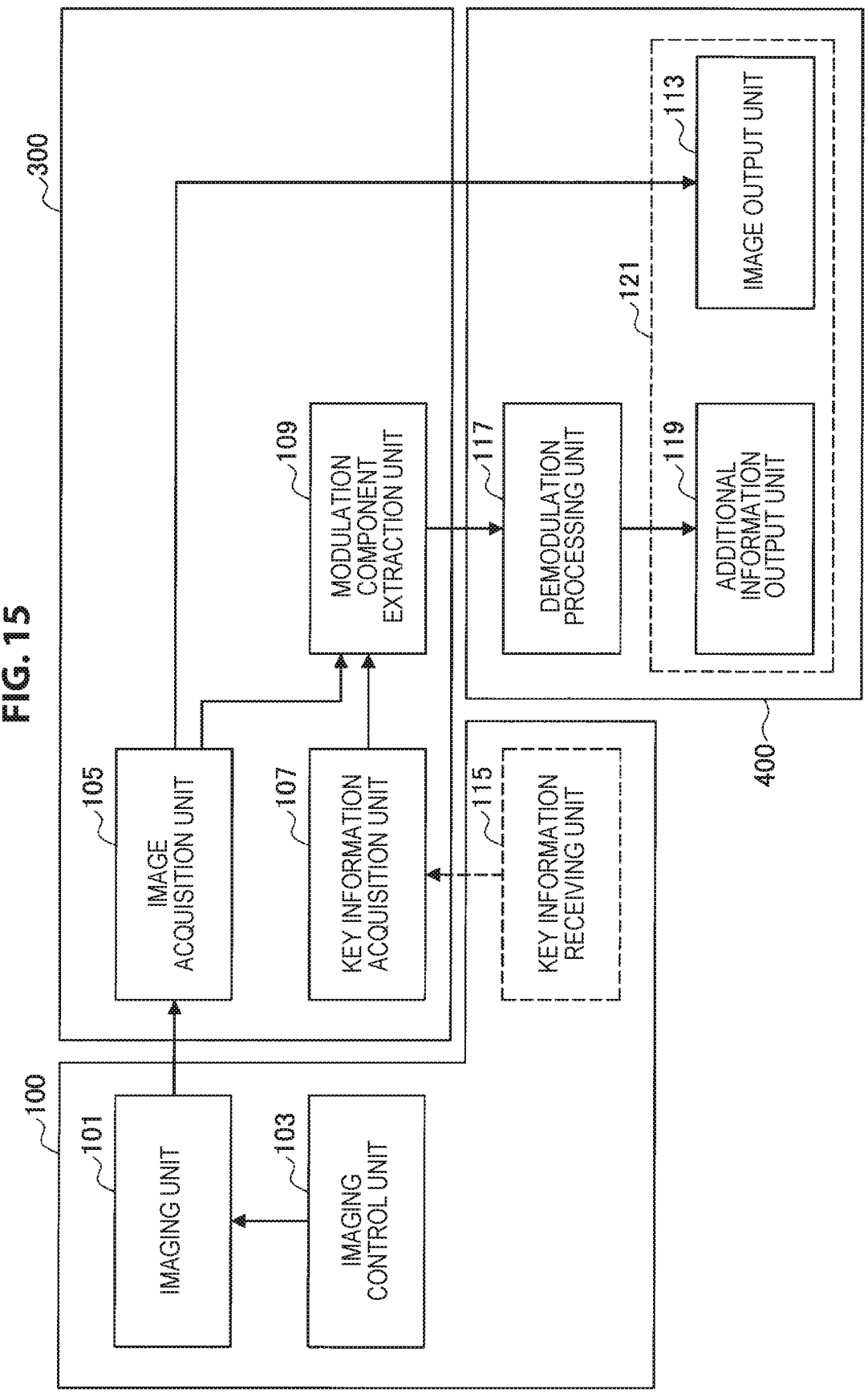
FIG. 15 is a block diagram for describing an example in which an image that is uploaded to a server is further downloaded to a reproduction device to be browsed, in an example of FIG. 14.

FIG. 15 is a block diagram for describing an example in which the image that is uploaded to the server 300 is further downloaded to a reproduction device 400 to be browsed, in the example of FIG. 14. Referring to FIG. 15, the demodulation processing unit 117, the additional information output unit 119, and the image output unit 113, among the functional configuration of the server 300 illustrated in FIG. 14, are moved into the reproduction device 400. In the illustrated example, the server 300 extracts the flicker component included in the captured image by the modulation component extraction unit 109, on the basis of the key information acquired by the key information acquisition unit 107. Further, the server 300 transmits the information indicating the extracted flicker component to the reproduction device 400.

In the illustrated example, the captured image generated by the imaging unit 101 of the imaging apparatus 100 is uploaded to the server 300 from the imaging apparatus 100, and thereafter is supplied to the reproduction device 400 together with the information indicating the flicker component extracted by the server 300. In the reproduction device 400, the image output unit 113 outputs the captured image, and the additional information output unit 119 outputs the additional information acquired by the demodulation processing unit 117 that demodulates the flicker component. The additional information output unit 119 and the image output unit 113 may be configured with the same display device 121, for example. Thereby, for example, an image in which the information acquired as the additional information is superimposed and displayed on the content image displayed on the screen device 200a and the captured image that includes the object OBJ for example, which are output from the imaging apparatus 100 in the example illustrated in FIG. 13, can be output in the reproduction device 400.

With the above configuration, the captured image and the additional information that is obtained by demodulating the flicker component included in the captured image can be output, in the reproduction device 400 that differs from the imaging apparatus 100 that acquires the captured image, in the illustrated example. Here, the reproduction device 400 can be a smartphone, a tablet, a personal computer, a television, a recorder that is used with a television, a game machine, or the like, for example. For example, the reproduction device 400 can be used to allow the user to browse the captured image posteriori. More specifically, the user can browse the image that is captured by using the imaging apparatus 100 in a movie theater and an exhibition hall, with the reproduction device 400 which is a television for example, together with the additional information, at home. Alternatively, the reproduction device 400 may be used to allow the user to browse the captured image in real time. More specifically, the user can browse the image that is captured by the imaging apparatus 100 which is a digital camera for example in a movie theater and an exhibition hall, with the reproduction device 400 which is a tablet or a smartphone for example, together with the additional information, on site.

Note that, in the above respective cases, the reproduction device 400 may be the same device as the imaging apparatus 100. That is, the captured image may be transmitted to the server 300 from a terminal device such as the smartphone or the tablet which is the imaging apparatus 100 and the reproduction device 400, and the extracted flicker component may be sent back to the terminal device. In this case, the captured image is needless to be sent back (but, can be sent back when the flicker component is removed in the server 300 as in an example described later). In this case, the server 300 executes the extraction process of the flicker component, and thereby can reduce the processing load of the imaging apparatus 100.

Note that the example of FIG. 15 can be transformed into an exemplary variant in which the key information receiving unit 115 is configured with the server 300 in the same way as the example illustrated in FIG. 12 for example. Also, the demodulation processing unit 117 can be configured with the server 300, to transmit the additional information obtained by the demodulation to the reproduction device 400. Also, the configuration that outputs the captured image in the reproduction device 400 is applicable to the configuration that removes the flicker component from the captured image as in the example illustrated in FIGS. 11 and 12 in the above, in the same way.

2-5. Example that Demodulates and Removes Flicker Component

Figure 16:
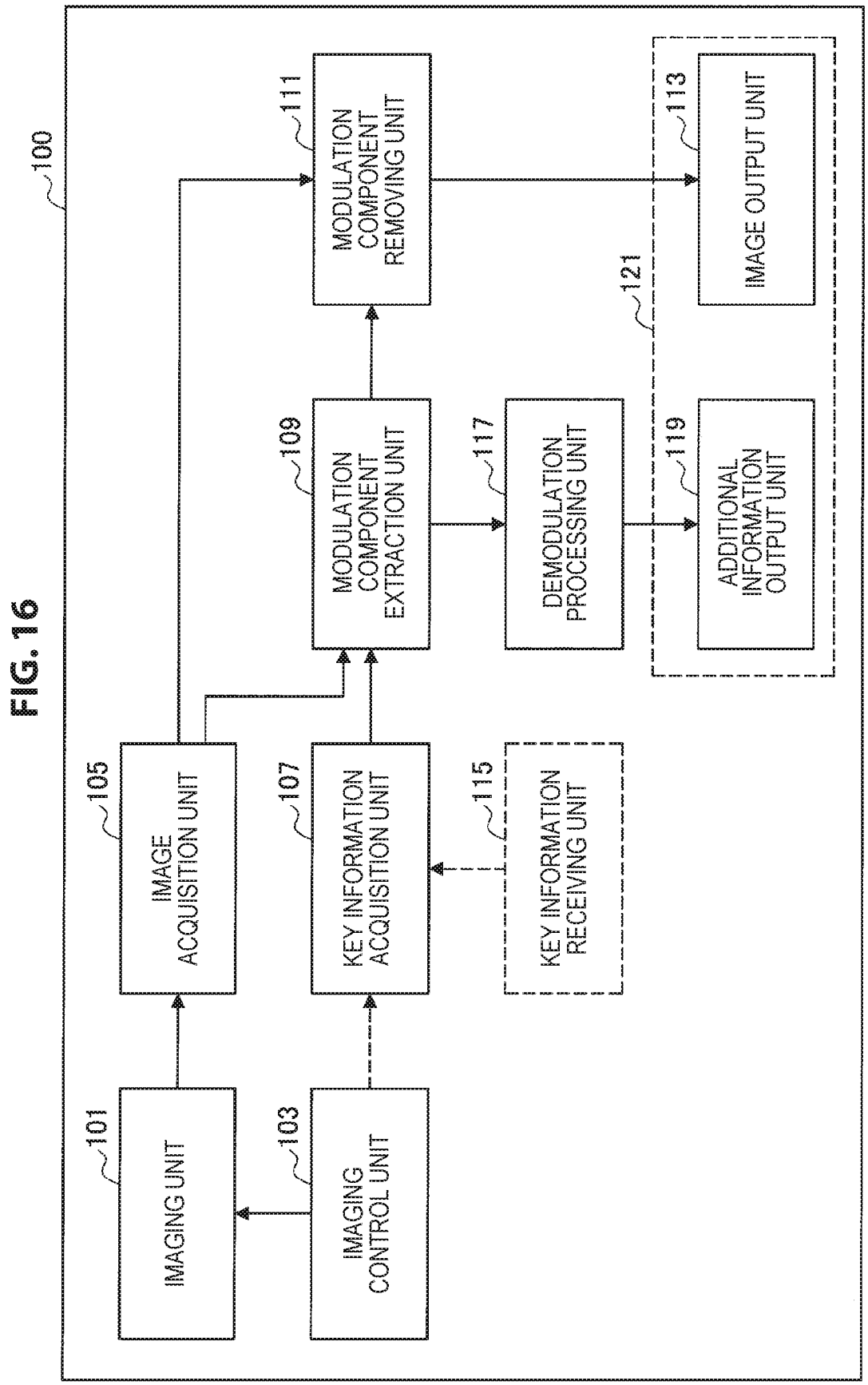
FIG. 16 is a block diagram for describing an example that demodulates a flicker component, in addition to removing the flicker component from a captured image, in the first and second embodiments of the present disclosure.

FIG. 16 is a block diagram for describing an example that demodulates the flicker component, in addition to removing the flicker component from the captured image, in the above first and second embodiments of the present disclosure. Referring to FIG. 16, the imaging apparatus 100 includes an imaging unit 101, an imaging control unit 103, an image acquisition unit 105, a key information acquisition unit 107, a modulation component extraction unit 109, a modulation component removing unit 111, an image output unit 113, a demodulation processing unit 117, and an additional information output unit 119. The imaging apparatus 100 may further include a key information receiving unit 115.

In the illustrated example, the flicker component is removed from the captured image by the modulation component removing unit 111 as in the example described with reference to FIG. 7 in the above for example, and the flicker component is demodulated by the demodulation processing unit 117, and the additional information is acquired. Thus, the user of the imaging apparatus 100 can output the captured image from which the flicker component is removed from the image output unit 113, as well as can refer to the additional information output from the additional information output unit 119. For example, when the display device 121 configures the image output unit 113 and the additional information output unit 119, the display device 121 is an output unit that outputs the captured image from which the flicker component is removed together with the additional information. Note that the same configuration is also applicable when the systems 10a, 10b includes the server 300, as illustrated in FIG. 11, FIG. 12, and FIG. 14, for example. Also, the above configuration is also applicable when the captured image is output from the reproduction device 400, as illustrated in FIG. 15, for example.

Figure 17:
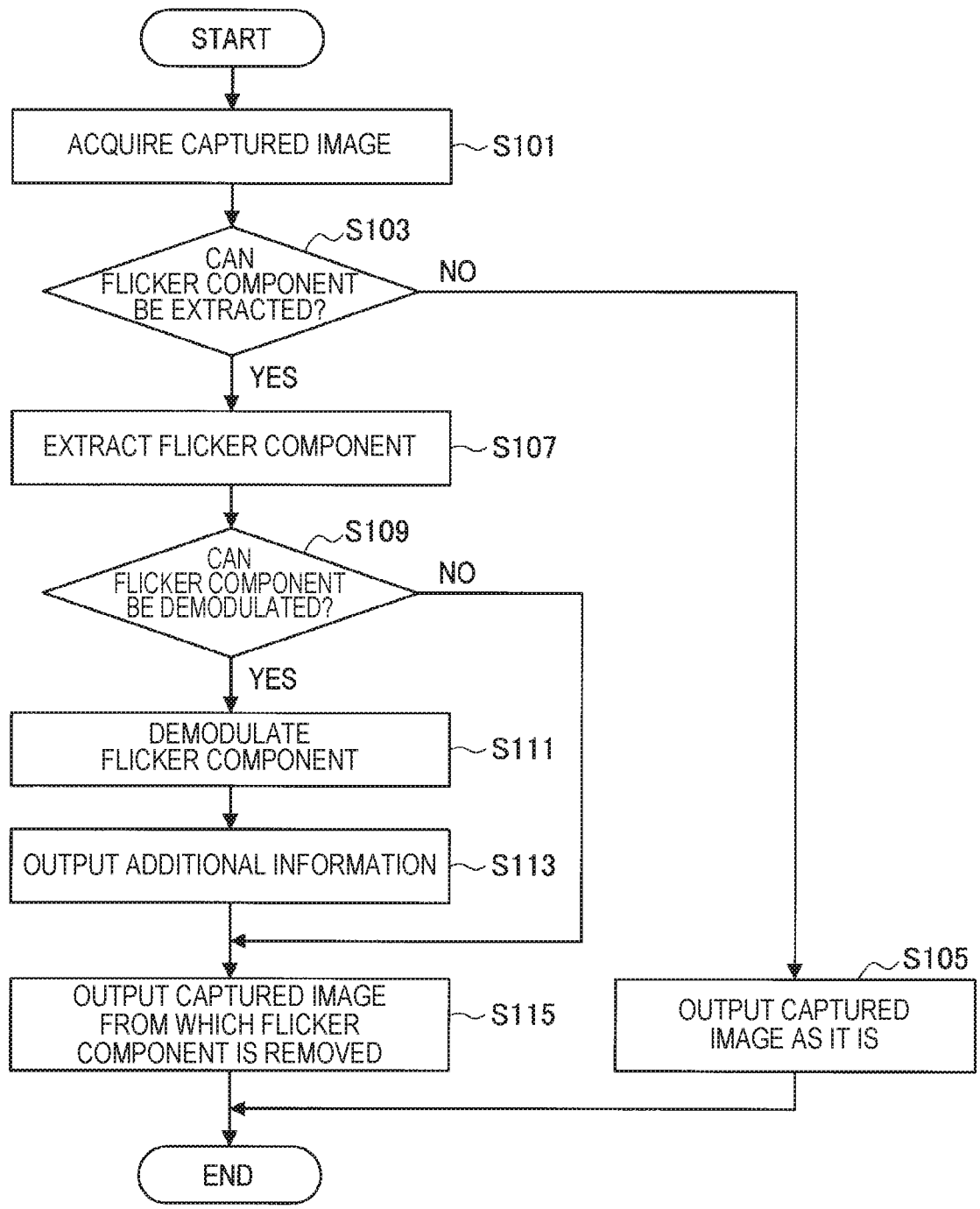
FIG. 17 is a flowchart illustrating a process in an example illustrated in FIG. 16.

FIG. 17 is a flowchart illustrating a process in the example illustrated in FIG. 16. In the example illustrated in FIG. 16, the image acquisition unit 105 first acquires the captured image generated by the imaging unit 101, in the imaging apparatus 100 (S101). Next, it is determined whether or not the modulation component extraction unit 109 can extract the flicker component from the captured image (S103). Here, if the effective key information is acquired by the key information acquisition unit 107, the flicker component can be extracted.

If the flicker component can be extracted in S103 (YES), the modulation component extraction unit 109 extracts the flicker component from the captured image (S107). In this case, subsequently, it is determined whether or not the demodulation processing unit 117 can demodulate the flicker component (S109). Here, if the flicker component is modulated in a form that the demodulation processing unit 117 can recognize, the demodulation can be performed.

If the flicker component can be demodulated in S109 (YES), the demodulation processing unit 117 demodulates the flicker component (S111), and the additional information output unit 119 outputs the additional information (S113). Further, the image output unit 113 outputs the captured image from which the flicker component is removed by the modulation component removing unit 111 (S115), including a case in which the flicker component is unable to be demodulated in S109 (NO).

On the other hand, if the flicker component is unable to be extracted in S103 (NO), the image output unit 113 outputs the captured image from which the flicker component is not removed, as it is (S105).

2-6. Third Embodiment

Figure 18:
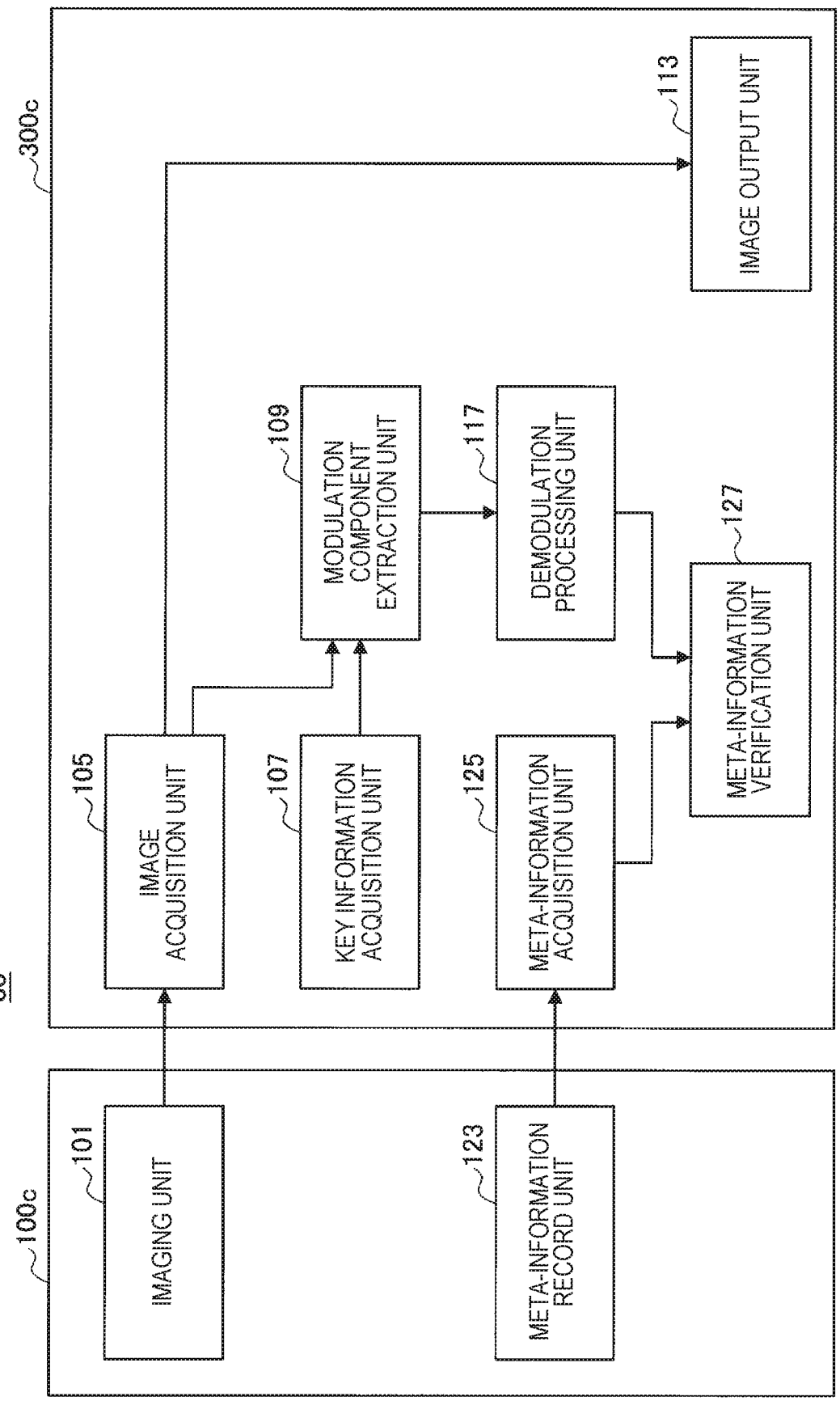
FIG. 18 is a block diagram for describing a third embodiment of the present disclosure.

FIG. 18 is a block diagram for describing a third embodiment of the present disclosure. Referring to FIG. 18, a system 30 according to the present embodiment includes an imaging apparatus 100c and a server 300c. The system 30 further includes a lighting device 200b (not illustrated in the drawing) that generates the flicker component in the captured image, in the same way as the above second embodiment, for example. The imaging apparatus 100c includes an imaging unit 101 and a meta-information record unit 123. The server 300c includes an image acquisition unit 105, a key information acquisition unit 107, a modulation component extraction unit 109, an image output unit 113, a demodulation processing unit 117, a meta-information acquisition unit 125, and a meta-information verification unit 127. In the following, the configuration of the imaging apparatus 100c and the server 300c will be described mainly about a part that differs from the above first and second embodiments.

The meta-information record unit 123 of the imaging apparatus 100c records meta-information together with the captured image, in parallel with the generation of the captured image by the imaging unit 101, or before or after the generation of the captured image. The meta-information includes information indicating a time point and/or a position at which the captured image is generated, for example. The recorded meta-information is transmitted to the server 300c from the imaging apparatus 100c, together with the captured image.

In the server 300c, the meta-information acquisition unit 125 acquires the meta-information received from the imaging apparatus 100c. The meta-information verification unit 127 verifies the meta-information acquired by the meta-information acquisition unit 125, against the additional information acquired by demodulating the flicker component included in the captured image by the demodulation processing unit 117.

In the present embodiment, in order to verify the meta-information, information corresponding to the meta-information is included in the additional information encoded into the flicker component. More specifically, the information indicating the time point and/or the position can be included in the additional information. For example, the lighting device 200b encodes the information indicating the time point and the position at which the lighting device 200b is installed, into the flicker component, as the additional information. With regard to these time point and the position, the imaging apparatus 100 that captures an image of the object illuminated by the lighting device 200b is substantially identical with the time point and the position indicated by the meta-information recorded together with the captured image.

The above configuration of the present embodiment can be utilized in falsification detection of the captured image and the metadata, for example. For example, when the captured image is falsified in a state including the flicker component (for example, erasing of the object, etc.), the flicker component of the falsified part is changed (or destructed), and therefore the modulation component extraction unit 109 is unable to extract the flicker component, or the demodulation processing unit 117 acquires incorrect additional information. In this case, verification between the meta-information and the additional information in the meta-information verification unit 127 does not succeed, and thus the falsification of the captured image is unable to be detected.

Also, for example, when the metadata is falsified (for example, modification of the time point and the position of image capturing, etc.), the additional information encoded into the flicker component is not changed, and thus the time point and the position (falsified) indicated by the meta-information acquired by the meta-information acquisition unit 125 are not identical with the time point and the position (not falsified) indicated by the additional information that is acquired by demodulating the flicker component by the demodulation processing unit 117, and the verification between the meta-information and the additional information in the meta-information verification unit 127 does not succeed. Thus, the falsification of the metadata can be detected.

Figure 19:
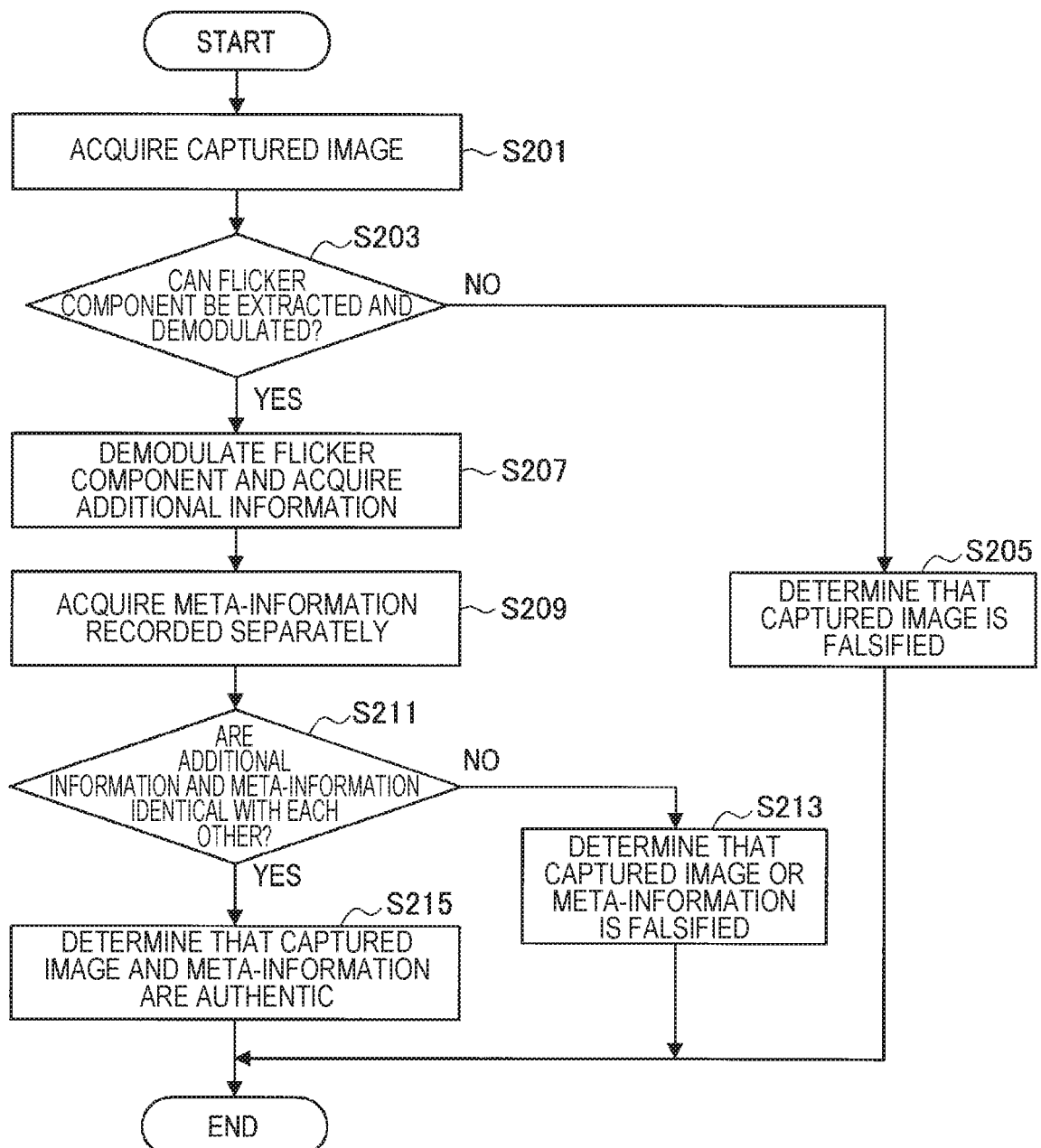
FIG. 19 is a flowchart illustrating a process in the third embodiment of the present disclosure.

FIG. 19 is a flowchart illustrating a process in the third embodiment of the present disclosure. Referring to FIG. 19, in the server 300c, the image acquisition unit 105 first acquires the captured image generated by the imaging apparatus 100c (S201). Next, it is determined whether or not the modulation component extraction unit 109 and the demodulation processing unit 117 can extract the flicker component from the captured image and can demodulate the extracted flicker component (S203). Here, the key information acquisition unit 107 is assumed to have acquired the effective key information from the lighting device 200b or the like, for example. Thus, as long as the flicker component included in the captured image is not changed (or destructed), the flicker component can be extracted and demodulated.

In S203, if the flicker component is unable to be extracted, or the extracted flicker component is unable to be demodulated (NO), the server 300c determines that the captured image is falsified (S205), and ends the process. On the other hand, in S203, if the flicker component can be extracted, and the extracted flicker component can be demodulated (YES), the demodulation processing unit 117 demodulates the flicker component and acquires the additional information (S207). Further, the meta-information acquisition unit 125 acquires the meta-information that is recorded separately in the imaging apparatus 100c (S209). The meta-information verification unit 127 determines whether or not the additional information acquired by the demodulation processing unit 117 and the meta-information acquired by the meta-information acquisition unit 125 are identical with each other (S211). Specifically, this determination can be determination of whether or not the time point and the position indicated by the additional information and the meta-information respectively are identical within a predetermined error range, for example.

If it is determined that the additional information and the meta-information are identical with each other in S211 (YES), the server 300c determines that both the captured image and the meta-information are authentic (S215). On the other hand, when it is determined that the additional information and the meta-information are not identical (NO), the server 300c determines that the captured image or the meta-information is falsified (S213). As described above, the extraction and the demodulation itself of the flicker component can be performed even when the captured image is falsified. However, even in that case, the additional information indicated by the flicker component, more specifically the time point and the position changes, and thus the falsification of the captured image can be detected.

In the above, several embodiments of the present disclosure have been described. Note that the functions achieved by the components of the system in the above description, for example the imaging apparatus 100, the screen device 200a, the lighting device 200b, the server 300, and the reproduction device 400 are just an example. For example, a different function from the above description may be assigned to each component. Although the flicker component has been generated by the temporal modulation of the brightness of the displaying light of the image and the illumination intensity of the illumination light in the above description, the flicker component may be generated by the modulation of the chromaticity of the displaying light and the illumination light of the image, in addition to or instead of the brightness and the illumination intensity.

Although the image sensor that acquires the captured image has been described as an example that employs the rolling shutter method or that performs the random sampling and the compression sampling, the embodiment of the present disclosure is not limited to these examples. For example, the image sensor may be an image sensor such as a charge coupled device (CCD) that makes it difficult to generate the spatial fluctuation of the brightness and the like due to the flicker component in a single frame. In this case as well, the temporal fluctuation of the brightness or the like is generated between a plurality of successive frames due to the flicker component, and thus the image capturing can be allowed for the user to whom the key information is supplied, and the additional information can be acquired by demodulating the flicker component, while preventing the secret videoing of the image and the object by the flicker component, in the same way as the embodiments described in the above.

3. Hardware Configuration

Figure 20:
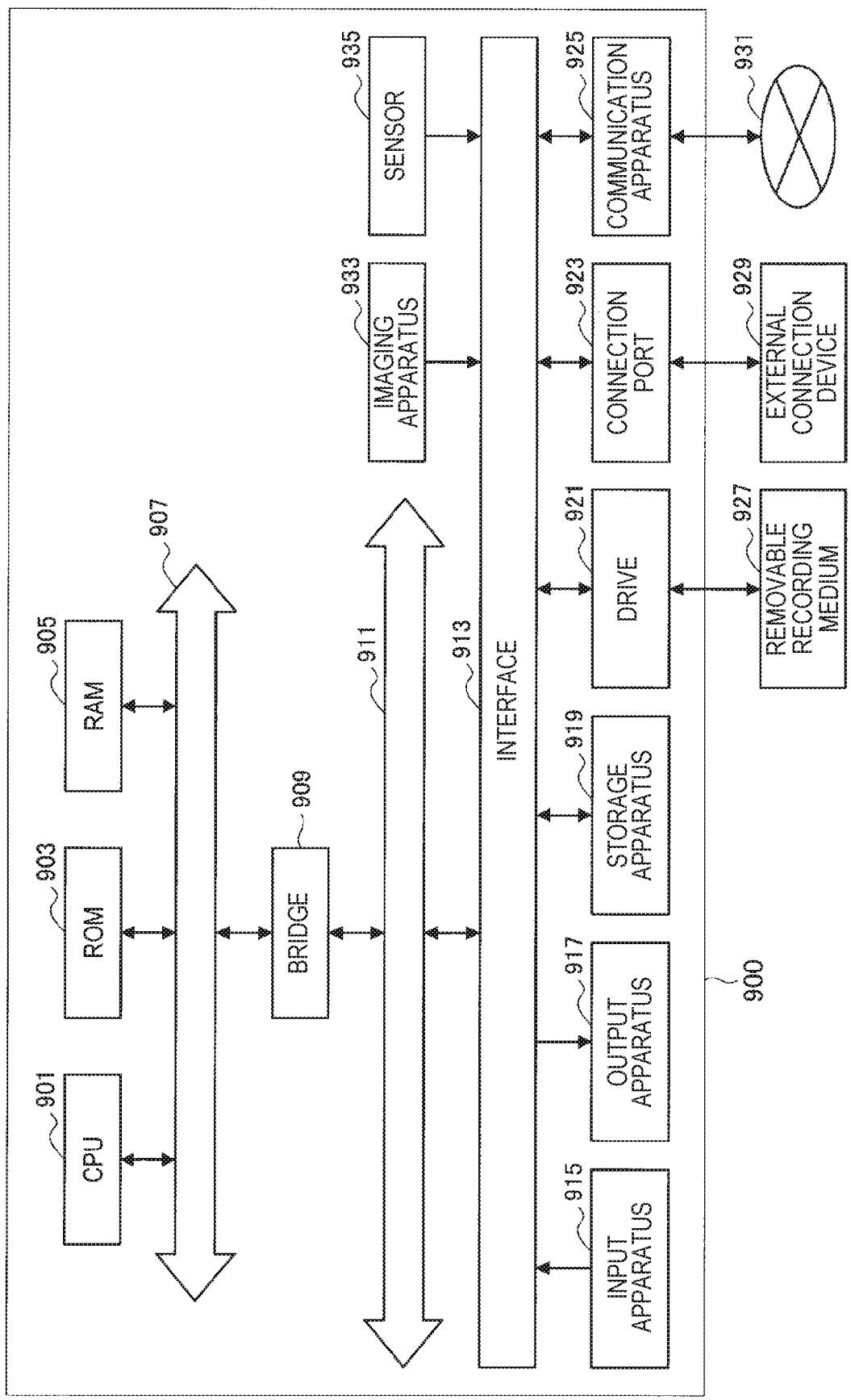
FIG. 20 is a block diagram illustrating an exemplary hardware configuration of an information processing apparatus according to an embodiment of the present disclosure.

Next, with reference to FIG. 20, a hardware configuration of an information processing apparatus according to an embodiment of the present disclosure is explained. FIG. 20 is a block diagram illustrating a hardware configuration example of an information processing apparatus according to the embodiment of the present disclosure. An illustrated information processing apparatus 900 may achieve the imaging apparatus, the screen device, the lighting device, the server, and/or the reproduction device according to the embodiments of the present disclosure, for example.

The information processing apparatus 900 includes a central processing unit (CPU) 901, read only memory (ROM) 903, and random access memory (RAM) 905. In addition, the information processing apparatus 900 may include a host bus 907, a bridge 909, an external bus 911, an interface 913, an input apparatus 915, an output apparatus 917, a storage apparatus 919, a drive 921, a connection port 923, and a communication apparatus 925. Moreover, the information processing apparatus 900 may include an imaging apparatus 933, and a sensor 935, as necessary. The information processing apparatus 900 may include a processing circuit such as a digital signal processor (DSP), an application-specific integrated circuit (ASIC), or a field-programmable gate array (FPGA), alternatively or in addition to the CPU 901.

The CPU 901 serves as an arithmetic processing apparatus and a control apparatus, and controls the overall operation or a part of the operation of the information processing apparatus 900 according to various programs recorded in the ROM 903, the RAM 905, the storage apparatus 919, or a removable recording medium 927. The ROM 903 stores programs, operation parameters, and the like used by the CPU 901. The RAM 905 transiently stores programs used when the CPU 901 is executed, and various parameters that change as appropriate when executing such programs. The CPU 901, the ROM 903, and the RAM 905 are connected with each other via the host bus 907 configured from an internal bus such as a CPU bus or the like. The host bus 907 is connected to the external bus 911 such as a Peripheral Component Interconnect/Interface (PCI) bus via the bridge 909.

The input apparatus 915 is a device operated by a user such as a mouse, a keyboard, a touch panel, a button, a switch, and a lever. The input apparatus 915 may be a remote control device that uses, for example, infrared radiation and another type of radiowave. Alternatively, the input apparatus 915 may be an external connection apparatus 929 such as a mobile phone that corresponds to an operation of the information processing apparatus 900. The input apparatus 915 includes an input control circuit that generates input signals on the basis of information which is input by a user to output the generated input signals to the CPU 901. A user inputs various types of data to the information processing apparatus 900 and instructs the information processing apparatus 900 to perform a processing operation by operating the input apparatus 915.

The output apparatus 917 includes an apparatus that can report acquired information to a user visually, audibly, or haptically. The output apparatus 917 may be, for example, a display device such as a liquid crystal display (LCD) or an organic electro-luminescence (EL) display, an audio output apparatus such as a speaker or a headphone, or a vibrator. The output apparatus 917 outputs a result obtained through a process performed by the information processing apparatus 900, in the form of video such as text and an image, sounds such as voice and audio sounds, or vibration.

The storage apparatus 919 is an apparatus for data storage that is an example of a storage unit of the information processing apparatus 900. The storage apparatus 919 includes, for example, a magnetic storage device such as a hard disk drive (HDD), a semiconductor storage device, an optical storage device, or a magneto-optical storage device. The storage apparatus 919 stores therein the programs and various data executed by the CPU 901, various data acquired from an outside, and the like.

The drive 921 is a reader/writer for the removable recording medium 927 such as a magnetic disk, an optical disc, a magneto-optical disk, and a semiconductor memory, and built in or externally attached to the information processing apparatus 900. The drive 921 reads out information recorded on the mounted removable recording medium 927, and outputs the information to the RAM 905. The drive 921 writes the record into the mounted removable recording medium 927.

The connection port 923 is a port used to connect devices to the information processing apparatus 900. The connection port 923 may include a Universal Serial Bus (USB) port, an IEEE1394 port, and a Small Computer System Interface (SCSI) port. The connection port 923 may further include an RS-232C port, an optical audio terminal, a High-Definition Multimedia Interface (HDMI) (registered trademark) port, and so on. The connection of the external connection device 929 to the connection port 923 makes it possible to exchange various data between the information processing apparatus 900 and the external connection device 929.

The communication apparatus 925 is a communication interface including, for example, a communication device for connection to a communication network 931. The communication apparatus 925 may be, for example, a communication card for a local area network (LAN), Bluetooth (registered trademark), Wi-Fi, or a wireless USB (WUSB). The communication apparatus 925 may also be, for example, a router for optical communication, a router for asymmetric digital subscriber line (ADSL), or a modem for various types of communication. For example, the communication apparatus 925 transmits and receives signals in the Internet or transits signals to and receives signals from another communication device by using a predetermined protocol such as TCP/IP. The communication network 931 to which the communication apparatus 925 connects is a network established through wired or wireless connection. The communication network 931 may include, for example, the Internet, a home LAN, infrared communication, radio communication, or satellite communication.

The imaging apparatus 933 is an apparatus that captures an image of a real space by using an image sensor such as a charge coupled device (CCD) and a complementary metal oxide semiconductor (CMOS), and various members such as a lens for controlling image formation of a subject image onto the image sensor, and generates the captured image. The imaging apparatus 933 may capture a still image or a moving image.

The sensor 935 is various sensors such as an acceleration sensor, an angular velocity sensor, a geomagnetic sensor, an illuminance sensor, a temperature sensor, a barometric sensor, and a sound sensor (microphone). The sensor 935 acquires information regarding a state of the information processing apparatus 900 such as a posture of a housing of the information processing apparatus 900, and information regarding an environment surrounding the information processing apparatus 900 such as luminous intensity and noise around the information processing apparatus 900. The sensor 935 may include a global positioning system (GPS) receiver that receives GPS signals to measure latitude, longitude, and altitude of the apparatus.

The example of the hardware configuration of the information processing apparatus 900 has been described. Each of the structural elements described above may be configured by using a general purpose component or may be configured by hardware specialized for the function of each of the structural elements. The configuration may be changed as necessary in accordance with the state of the art at the time of working of the present disclosure.

4. Supplement

The embodiments of the present disclosure may include, for example, the above-described information processing apparatus (for example, the imaging apparatus, the screen device, the lighting device, the server, or the reproduction device), the above-described system, the information processing method executed by the information processing apparatus or the system, a program for causing the information processing apparatus to exhibits its function, and a non-transitory physical medium having the program stored therein.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

an image acquisition unit that acquires a captured image;

a key information acquisition unit that acquires key information for extracting a light temporal modulation component included in the captured image; and a modulation component extraction unit that extracts the modulation component from the captured image on the basis of the key information.

(2)

The information processing apparatus according to (1), further including:

a modulation component removing unit that removes the modulation component from the captured image.

(3)

The information processing apparatus according to (1) or (2), further including:

a demodulation processing unit that acquires additional information of the captured image by demodulating the modulation component.

(4)

The information processing apparatus according to (3), further including:

a modulation component removing unit that removes the modulation component from the captured image; and an output unit that outputs the captured image from which the modulation component is removed, together with the additional information.

(5)

The information processing apparatus according to (3) or (4), further including:

a meta-information acquisition unit that acquires meta-information recorded together with the captured image; and an additional information verification unit that verifies the meta-information and the additional information.

(6)

The information processing apparatus according to (5), wherein the meta-information and the additional information each include information indicating a time point or a position relevant to the captured image.

(7)

The information processing apparatus according to (3) or (4), wherein the key information acquisition unit acquires the key information for extracting the light temporal modulation component included in a subsequent captured image, from the additional information of a preceding captured image.

(8)

The information processing apparatus according to any one of (1) to (7), wherein the captured image includes a first region that is captured during a first light exposure time and a second region that is captured during a second light exposure time that differs from the first light exposure time, and the first region and the second region are arrayed over an entire area of the captured image, and the key information includes information indicating at least one of the first light exposure time and the second light exposure time.

(9)

The information processing apparatus according to any one of (1) to (7), wherein the captured image is generated by an imaging unit that performs random sampling, and the key information includes information indicating a pattern of the random sampling.

(10)

The information processing apparatus according to any one of (1) to (7), wherein the captured image is generated by an imaging unit that performs compression sampling, and the key information includes information indicating a sampling matrix of the compression sampling.

(11)

The information processing apparatus according to any one of (1) to (7), wherein the key information includes information indicating a pattern of the modulation component.

(12)

The information processing apparatus according to any one of (1) to (11), further including:

a key information receiving unit that receives the key information from outside.

(13)

The information processing apparatus according to (12), wherein the key information receiving unit includes a communication device that receives the key information by wireless communication.

(14)

The information processing apparatus according to (12), wherein the key information receiving unit includes an imaging apparatus that reads a visible code in which the key information is encoded.

(15)

The information processing apparatus according to (12), wherein the key information receiving unit includes a reader of a removable recording medium in which the key information is recorded.

(16)

The information processing apparatus according to any one of (1) to (11), wherein the key information acquisition unit internally acquires the key information.

(17)

The information processing apparatus according to any one of (1) to (16), wherein the modulation component is generated by modulating a light for electronically displaying an image included in the captured image.

(18)

The information processing apparatus according to any one of (1) to (16), wherein the modulation component is added by modulating an environmental light of an object included in the captured image.

REFERENCE SIGNS LIST 10 system
100 imaging apparatus
101 imaging unit
103 imaging control unit
105 image acquisition unit
107 key information acquisition unit
109 modulation component extraction unit
111 modulation component removing unit
113 image output unit
115 key information receiving unit
117 demodulation processing unit
119 additional information output unit
125 meta-information acquisition unit
127 meta-information verification unit
200a screen device
200b lighting device
300 server
400 reproduction device

The invention claimed is:

1. An information processing apparatus, comprising:
a central processing unit (CPU) configured to:
acquire a captured image from an imaging device, wherein
the captured image includes
a light temporal modulation component,
a first region captured during a first light exposure time, and
a second region captured during a second light exposure time,
the second light exposure time is different from the first light exposure time, and
the first region and the second region are arrayed over an entire area of the captured image;
acquire, from the captured image, key information that comprises first information and second information, wherein
the first information is associated with control of the imaging device, and
the second information indicates at least one of the first light exposure time or the second light exposure time; and
extract the light temporal modulation component from the captured image based on the acquired key information.

2. The information processing apparatus according to claim 1, wherein the CPU is further configured to remove the light temporal modulation component from the captured image.

3. The information processing apparatus according to claim 1, wherein
the captured image is generated by the imaging device that executes a random sampling process, and
the key information further includes third information indicating a pattern of the random sampling process.

4. The information processing apparatus according to claim 1, wherein
the captured image is generated by the imaging device that executes a compression sampling process, and
the key information further includes third information indicating a sampling matrix of the compression sampling process.

5. The information processing apparatus according to claim 1, wherein the key information further includes third information indicating a pattern of the light temporal modulation component.

6. The information processing apparatus according to claim 1, wherein the first information includes at least one of a light exposure time of a region of the captured image, a pattern of a random sampling process, or a sample matrix of a compression sampling process.

7. An information processing apparatus, comprising:
a central processing unit (CPU) configured to:
- acquire a captured image, including a light temporal modulation component, from an imaging device, wherein the imaging device executes a random sampling process;
- acquire key information to extract the light temporal modulation component included in the captured image, wherein the key information includes information indicating a pattern of the random sampling process; and
- extract the light temporal modulation component from the captured image based on the key information.

8. An information processing apparatus, comprising:
a central processing unit (CPU) configured to:
- acquire a captured image, including a light temporal modulation component, from an imaging device, wherein the imaging device executes a compression sampling process;
- acquire key information to extract the light temporal modulation component included in the captured image, wherein the key information includes information indicating a sampling matrix of the compression sampling process; and
- extract the light temporal modulation component from the captured image based on the key information.

* * * * *